(12) United States Patent
Mizuno

(10) Patent No.: US 7,792,375 B2
(45) Date of Patent: *Sep. 7, 2010

(54) RATE CONTROL SYSTEM

(75) Inventor: Yusuke Mizuno, Osaka (JP)

(73) Assignee: MegaChips Corporation, Osaka-shi (JP)

( * ) Notice: Subject to any disclaimer, the term of this patent is extended or adjusted under 35 U.S.C. 154(b) by 1107 days.

This patent is subject to a terminal disclaimer.

(21) Appl. No.: 11/037,115

(22) Filed: Jan. 19, 2005

(65) Prior Publication Data

US 2006/0159355 A1 Jul. 20, 2006

(51) Int. Cl.
*G06K 9/36* (2006.01)
*G06K 9/46* (2006.01)

(52) U.S. Cl. ............... 382/240; 382/166; 382/248

(58) Field of Classification Search ............... 382/166, 382/240, 248; 348/395.1, 403.1; 375/240.19
See application file for complete search history.

(56) References Cited

U.S. PATENT DOCUMENTS

| | | | | | |
|---|---|---|---|---|---|
| 5,748,793 | A | * | 5/1998 | Sanpei | 382/251 |
| 5,966,465 | A | * | 10/1999 | Keith et al. | 382/232 |
| 6,091,777 | A | * | 7/2000 | Guetz et al. | 375/240.11 |
| 6,792,153 | B1 | * | 9/2004 | Tsujii | 382/239 |
| 6,867,785 | B2 | * | 3/2005 | Smith | 345/582 |
| 2001/0047517 | A1 | * | 11/2001 | Christopoulos et al. | 725/87 |
| 2002/0018598 | A1 | * | 2/2002 | Maeda et al. | 382/239 |
| 2003/0067476 | A1 | * | 4/2003 | Miller et al. | 345/598 |
| 2003/0081848 | A1 | * | 5/2003 | Wada | 382/240 |
| 2004/0057514 | A1 | * | 3/2004 | Kishi | 375/240.01 |
| 2004/0135903 | A1 | * | 7/2004 | Brooks et al. | 348/231.99 |
| 2004/0165789 | A1 | * | 8/2004 | Ii | 382/299 |
| 2005/0002573 | A1 | | 1/2005 | Joshi et al. | |
| 2005/0010396 | A1 | * | 1/2005 | Chiu et al. | 704/200.1 |
| 2005/0084169 | A1 | * | 4/2005 | Kadowaki | 382/240 |
| 2005/0179568 | A1 | * | 8/2005 | Wee et al. | 341/50 |

FOREIGN PATENT DOCUMENTS

JP   2005-27309   1/2005

OTHER PUBLICATIONS

David S. Taubman, et al., "JPEG2000 Image Compression Fundamentals, Standards, and Practice", Kluwer Academic Publishers, 4 cover pages, p. 142, pp. 192 and 193, p. 326, pp. 374-377, 1 page chapter 16, and pp. 626 through 627, 2001.
"JPEG 2000 Part 1 FDIS (includes COR 1, COR 2, and DCOR 3)", ISO/IEC JTC 1/SC 29/WG1 (ITU-T SG8) N2406, Dec. 4, 2001, 2 cover pages, pp. i-iii, pp. 213-217.

* cited by examiner

*Primary Examiner*—Yubin Hung
(74) *Attorney, Agent, or Firm*—Oblon, Spivak, McClelland, Maier & Neustadt, L.L.P.

(57) ABSTRACT

In a rate control system, an MMU temporarily stores in a mass storage an input bit stream including compressed and encoded data which is compressed and encoded according to the JPEG2000 standard. The MMU then reads out data from the mass storage and outputs it to a multiplexer according to readout control signals. The multiplexer multiplexes the data and outputs the result as an output bit stream. A bit truncation controller comprises an image quality controller for selecting a target to be coded according to target image quality; and a rate controller for controlling a rate according to a target rate. A layer splitting controller outputs to the MMU the readout control signal for generating an output bit stream which is divided into a plurality of layers.

20 Claims, 22 Drawing Sheets

FIG. 6

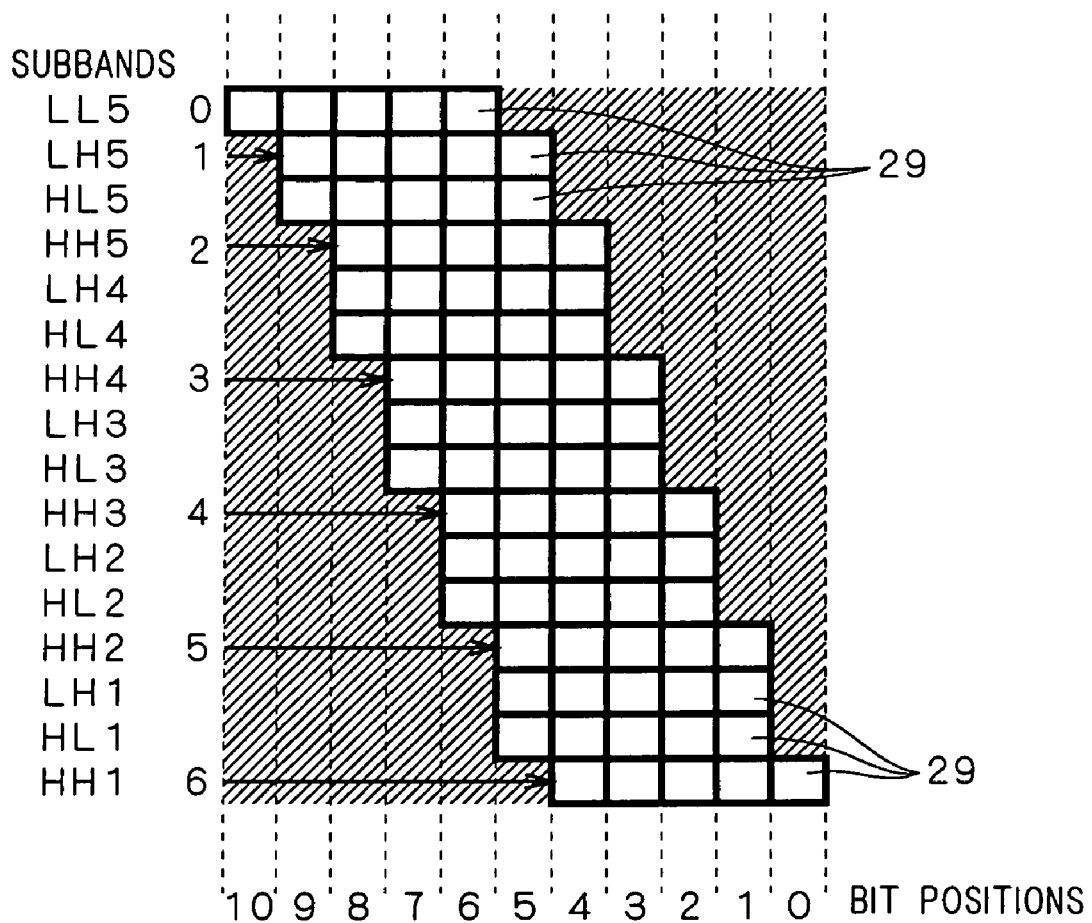
F I G . 8

FIG. 9    Table J-24 — Recommended frequency weighting

| level | Viewing distance 1000 | | | Viewing distance 2000 | | | Viewing distance 4000 | | |
|---|---|---|---|---|---|---|---|---|---|
| | HL | LH | HH | HL | LH | HH | HL | LH | HH |
| 5 | 1 | 1 | 1 | 1 | 1 | 1 | 1 | 1 | 1 |
| 4 | 1 | 1 | 1 | 1 | 1 | 1 | 1 | 1 | 0,731 668 |
| 3 | 1 | 1 | 1 | 1 | 1 | 0,727 203 | 0,564 344 | 0,564 344 | 0,285 968 |
| 2 | 1 | 1 | 0,727 172 | 0,560 841 | 0,560 841 | 0,284 193 | 0,179 609 | 0,179 609 | 0,043 903 |
| 1 | 0,560 805 | 0,560 805 | 0,284 173 | 0,178 494 | 0,178 494 | 0,043 631 | 0,014 774 | 0,014 774 | 0,000 573 |

FIG. 10

Table J-25 Recommended frequency weighting for multiple component (colour) images

| Comp | Lev | Viewing distance 1000 | | | Viewing distance 1700 | | | Viewing distance 3000 | | |
|---|---|---|---|---|---|---|---|---|---|---|
| | | HL | LH | HH | HL | LH | HH | HL | LH | HH |
| Y (Y0) | 5 | 1 | 1 | 1 | 1 | 1 | 1 | 1 | 1 | 1 |
| | 4 | 1 | 1 | 1 | 1 | 1 | 1 | 1 | 1 | 1 |
| | 3 | 1 | 1 | 1 | 1 | 1 | 1 | 1 | 1 | 0,848 324 |
| | 2 | 0,998 276 | 0,998 276 | 0,996 555 | 0,861 593 | 0,861 593 | 0,742 342 | 0,921 045 | 0,921 045 | 0,182 760 |
| | 1 | 0,756 353 | 0,756 353 | 0,573 057 | 0,307 191 | 0,307 191 | 0,108 920 | 0,410 628 | 0,410 628 | 0,003 075 |
| Cb (Y1) | 5 | 0,883 196 | 0,883 196 | 0,833 582 | 0,818 766 | 0,818 766 | 0,745 875 | 0,038 487 | 0,038 487 | 0,613 777 |
| | 4 | 0,793 487 | 0,793 487 | 0,712 295 | 0,689 404 | 0,689 404 | 0,579 220 | 0,717 086 | 0,717 086 | 0,403 353 |
| | 3 | 0,650 482 | 0,650 482 | 0,531 700 | 0,501 652 | 0,501 652 | 0,362 279 | 0,539 437 | 0,539 437 | 0,185 609 |
| | 2 | 0,450 739 | 0,450 739 | 0,309 177 | 0,280 068 | 0,280 068 | 0,152 290 | 0,319 773 | 0,319 773 | 0,044 711 |
| | 1 | 0,230 503 | 0,230 503 | 0,113 786 | 0,097 816 | 0,097 816 | 0,031 179 | 0,124 021 | 0,124 021 | 0,003 413 |

FIG. 11

Table J-25 — Recommended frequency weighting for multiple component (colour) images (continued)

| C o m p | L e v | Viewing distance 1000 | | | Viewing distance 1700 | | | Viewing distance 3000 | | |
|---|---|---|---|---|---|---|---|---|---|---|
| | | HL | LH | HH | HL | LH | HH | HL | LH | HH |
| Cr (Y2) | 5 | 0,910 877 | 0,910 877 | 0,872 378 | 0,860 885 | 0,860 885 | 0,803 172 | 0,780 091 | 0,780 091 | 0,695 128 |
| | 4 | 0,841 032 | 0,841 032 | 0,776 180 | 0,757 626 | 0,757 626 | 0,665 951 | 0,631 632 | 0,631 632 | 0,509 729 |
| | 3 | 0,725 657 | 0,725 657 | 0,625 103 | 0,598 537 | 0,598 537 | 0,470 893 | 0,428 659 | 0,428 659 | 0,287 593 |
| | 2 | 0,552 901 | 0,552 901 | 0,418 938 | 0,388 492 | 0,388 492 | 0,248 566 | 0,211 871 | 0,211 871 | 0,100 658 |
| | 1 | 0,336 166 | 0,336 166 | 0,200 507 | 0,177 435 | 0,177 435 | 0,077 130 | 0,060 277 | 0,060 277 | 0,014 977 |

F I G . 2 1

RATE CONTROL SYSTEM

BACKGROUND OF THE INVENTION

1. Field of the Invention

The present invention relates to a rate control system for controlling the rate of a bit stream including a compressed image signal.

2. Description of the Background Art

As a next-generation high-efficiency coding standard for image data, the International Organization for Standardization (ISO) and the International Telecommunications Union-Telecommunication Standardization Sector (ITU-T) have being developing the Joint Photographic Experts Group 2000 (JPEG2000) standard. The JPEG2000 standard provides functions superior to the Joint Photographic Experts Group (JPEG) standard which is currently in the mainstream, and features the adoption of discrete wavelet transform (DWT) for orthogonal transformation and of a technique called "Embedded Block Coding with Optimized Truncation (EBCOT)" which preforms bit-plane coding, for entropy coding.

Hereinbelow, a general description of the procedure of compression and coding according to the JPEG2000 standard is given with reference to a compression encoder 100 shown in FIG. 23.

An image signal inputted to the compression encoder 100 is DC level shifted in a DC level shift unit 102 as needed, and outputted to a color-space conversion unit 103. The color-space conversion unit 103 converts the color space of a signal inputted from the DC level shift unit 102. Then, a tiling unit 104 divides an image signal inputted from the color-space conversion unit 103 into a plurality of rectangular regional components called "tiles" and outputs those components to a DWT unit 105. The DWT unit 105 performs integer or real-number DWT on each tile of an image signal inputted from the tiling unit 104 and outputs transform coefficients as a result. In DWT, a one-dimensional (1-D) filter, which divides a two-dimensional (2-D) image signal into high-pass (high-frequency) and low-pass (low-frequency) components, is applied in vertical and horizontal directions in this order. In the fundamentals of the JPEG2000 standard, an octave band splitting method is adopted in which only those bandpass components (subbands) which are divided into the low frequency side in both the vertical and horizontal directions are recursively divided into further subbands. The number of recursive divisions is called the decomposition level.

FIG. 24 is a schematic view showing a 2-D image 120 subjected to DWT with the third decomposition level using the octave band splitting method. At the first decomposition level, the 2-D image 120 is divided into four subbands HH1, HL1, LH1, and LL1 (not shown) by sequential application of the aforementioned 1-D filter in the vertical and horizontal directions. Here, "H" and "L" stand for high- and low-pass components, respectively. For example, HL1 is the subband consisting of a horizontally high-pass component H and a vertically low-pass component L of the first decomposition level. To generalize the notation, "XYn" (X and Y are either H or L; n is an integer of 1 or more) represents a subband consisting of a horizontal component X and a vertical component Y of the n-th decomposition level.

At the second decomposition level, the low-pass component LL1 is divided into subbands HH2, HL2, LH2, and LL2 (not shown). Further, at the third decomposition level, the low-pass component LL2 is divided into further subbands HH3, HL3, LH3, and LL3. An arrangement of the resultant subbands HH1, HL1, LH1, HH2, HL2, LH2, HH3, HL3, LH3, and LL3 is shown in FIG. 24.

A quantization unit 106 has the function of performing scalar quantization on transform coefficients outputted from the DWT unit 105 as needed. The quantization unit 106 also has the function of performing a bit-shift operation in which higher priority is given to the image quality of an ROI (region of interest) which is specified by an ROI unit 107. Now, in reversible (lossless) transformation, scalar quantization is not performed in the quantization unit 106. The JPEG2000 standard provides two kinds of quantization means: the scalar quantization in the quantization unit 106 and post-quantization (truncation) which will be described later.

Then, transform coefficients outputted from the quantization unit 106 are, according to the aforementioned EBCOT, entropy coded on a block-by-block basis in a coefficient bit modeling unit 108 and an arithmetic coding unit 109, and they are rate controlled in a rate control unit 110. More specifically, the coefficient bit modeling unit 108 divides each subband of input transform coefficients into regions called "code blocks" of, for example, approximately size 32×32 or 64×64 and further decomposes each code block into a plurality of bit planes each constituting a two-dimensional array of respective one bits of the transform coefficients.

FIG. 25 is a schematic view showing the 2-D image 120 decomposed into a plurality of code blocks 121. FIG. 26 is a schematic view showing n bit planes $122_0$ through $122_{n-1}$ (n is a natural number) consisting of each code block 121. As shown in FIG. 26, decomposition is performed such that, where a binary value 123 representing one transform coefficient in a code block 121 is "011 . . . 0," then bits constituting this binary value 123 belong respectively to the bit planes $122_{n-1}$, $122_{n-2}$, $122_{n-3}$, . . . , and $122_0$. In the figure, the bit plane $122_{n-1}$ represents the most-significant bit plane consisting only of the most-significant bits of the transform coefficients, and the bit plane $122_0$ represents the least-significant bit plane consisting only of the least-significant bits of the transform coefficients.

Then, the coefficient bit modeling unit 108 judges the context of each bit in each bit plane $122_k$ (k=0 to n−1), and as shown in FIG. 27, decomposes the bit plane $122_k$ according to the significance of each bit judgment result), into three types of coding passes: a significance propagation (SIG) pass, a magnitude refinement (MR) pass, and a cleanup (CL) pass. The context judgment algorithm for each coding pass is determined by the JPEG2000 standard. According to the algorithm, the state of being "significant" means that a coefficient concerned has already been found not to be zero in previous coding, and the state of being "not significant" means that the value of a coefficient concerned is or possibly zero.

The coefficient bit modeling unit 108 performs bit-plane coding with the three types of coding passes: the SIG pass (coding pass for insignificant coefficients with significant neighbors), the MR pass (coding pass for significant coefficients), and the CL pass (coding pass for the remaining coefficients which belongs to neither the SIG nor MR pass). The bit-plane coding is performed, starting from the most-significant to the least-significant bit plane, by scanning each bit plane in four bits at a time and determining whether there exist significant coefficients. The number of bit planes consisting only of insignificant coefficients (0 bits) is recorded in a packet header, and actual coding starts from a bit plane where a significant coefficient first appears. The bit plane from which coding starts is coded in only the CL pass, and lower-order bit planes than that bit plane are sequentially coded in the above three types of coding passes.

Then, the arithmetic coding unit 109, using an MQ coder, performs arithmetic coding of a coefficient sequence provided from the coefficient bit modeling unit 108 on a codingpass-by-coding-pass basis according to the result of context judgment. This arithmetic coding unit 109 also has a mode of performing bypass processing in which a part of the coefficient sequence inputted from the coefficient bit modeling unit 108 is not arithmetically coded.

Then, the rate control unit 110 performs post-quantization for truncation of lower-order bit planes of a code sequence outputted from the arithmetic coding unit 109, thereby to control a final rate. A bit-stream generation unit 111 generates a bit stream by multiplexing a code sequence outputted from the rate control unit 110 and attached information (header information, layer structure, scalability, quantization table, etc.) and outputs it as a compressed image.

The compression encoder with the aforementioned configuration adopts, as a method for compressing the amount of image data, for example a technique called rate-distortion (R-D) optimization utilizing the rate control method employed in the rate control unit 110 (cf. David S. Taubman and Michael W. Marcellin, "JPEG2000 Image Compression Fundamentals, Standards and Practice," Kluwer Academic Publishers, which is hereinafter referred to as the "non-patent literature").

SUMMARY OF THE INVENTION

The present invention is directed to a rate control system for controlling the rate of a bit stream including a compressed image signal.

According to an aspect of the present invention, the rate control system comprises an image-quality controller for, in compressed image data compressed by recursively dividing an image signal into high- and low-pass components using wavelet transform to generate transform coefficients in a plurality of bandpass components and then by entropy coding the transform coefficients, bit shifting each of the plurality of bandpass components by the number of bits corresponding to a priority which is set according to the number of recursive divisions into the low-pass components; and for selecting a target to be coded which is appropriate to target image quality from the plurality of bandpass components which have been bit shifted.

This allows efficient specification of a target to be coded according to a target image quality of a compressed image and thereby achieves high-speed rate control with minimal operations as compared with conventional techniques.

According to another aspect of the present invention, the rate control system comprises a rate controller for, in compressed image data compressed by recursively dividing an image signal into high- and low-pass components using wavelet transform to generate transform coefficients in a plurality of bandpass components and then by entropy coding the transform coefficients, bit shifting each of the plurality of bandpass components by the number of bits corresponding to a priority which is set according to the number of recursive divisions into the low-pass components; and for calculating a truncation point appropriate to a target rate from a code sequence generated by sorting coded data of the plurality of bandpass components which have been bit shifted, in a predetermined order of scanning, so that a part of the code sequence before the truncation point is outputted.

This allows efficient rate control of compressed and encoded data according to priorities set for each bandpass component, without requiring decoding of the compressed and encoded data.

Thus, an object of the present invention is to provide a rate control system which allows rate control of a bit stream including compressed and encoded data with minimal operations and at high speed, so as to control distortion for a given rate.

These and other objects, features, aspects and advantages of the present invention will become more apparent from the following detailed description of the present invention when taken in conjunction with the accompanying drawings.

BRIEF DESCRIPTION OF THE DRAWINGS

FIGS. 6 and 7 are schematic views showing a 2-D image divided into subbands by wavelet transform;

FIG. 8 is a schematic view showing transform coefficients in subbands which are right bit shifted according to priorities shown in FIG. 7;

FIGS. 9, 10, and 11 give numerical tables of energy weighting factors;

FIG. 21 shows a code sequence sorted by coding pass;

FIG. 26 is a schematic view showing a plurality of bit planes constituting a code block; and FIG. 27 is a schematic view showing three types of coding passes.

DESCRIPTION OF THE PREFERRED EMBODIMENTS

Hereinbelow, a preferred embodiment of the present invention is described.

<Configuration of Rate Control System>

Figure 1:
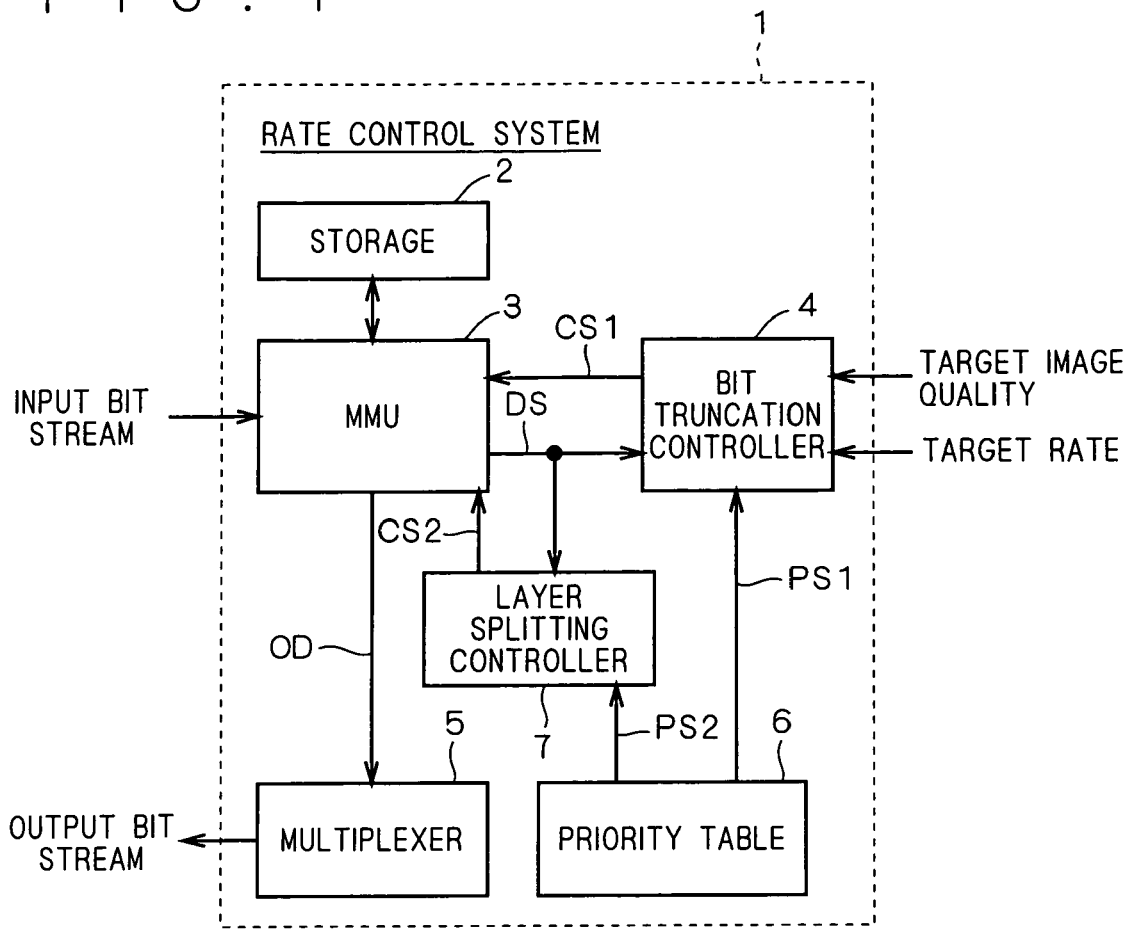
FIG. 1 is a functional block diagram showing a general configuration of a rate control system according to a preferred embodiment of the present invention.

FIG. 1 is a functional block diagram showing a general configuration of a rate control system (transcoder) 1 according to the preferred embodiment of the present invention. This rate control system 1 comprises a mass storage 2, a memory management unit (MMU) 3 for reading data from and writing data to the mass storage 2, a bit truncation controller 4, a multiplexer 5, a priority table 6, and a layer splitting controller 7.

All or parts of the processing units 4-7 in the rate control system 1 may consist of hardware or programs that run on a microprocessor.

In the rate control system 1, the MMU 3 temporarily stores in the mass storage 2 an input bit stream including compressed and encoded data which is compressed and encoded according to the JPEG2000 standard. The MMU 3 then reads out data OD from the mass storage 2 and outputs it to the multiplexer 5 according to readout control signals CS1 and CS2 for controlling the rate of data. The multiplexer 5 multiplexes the data OD and outputs the result as an output bit stream.

Figure 2:
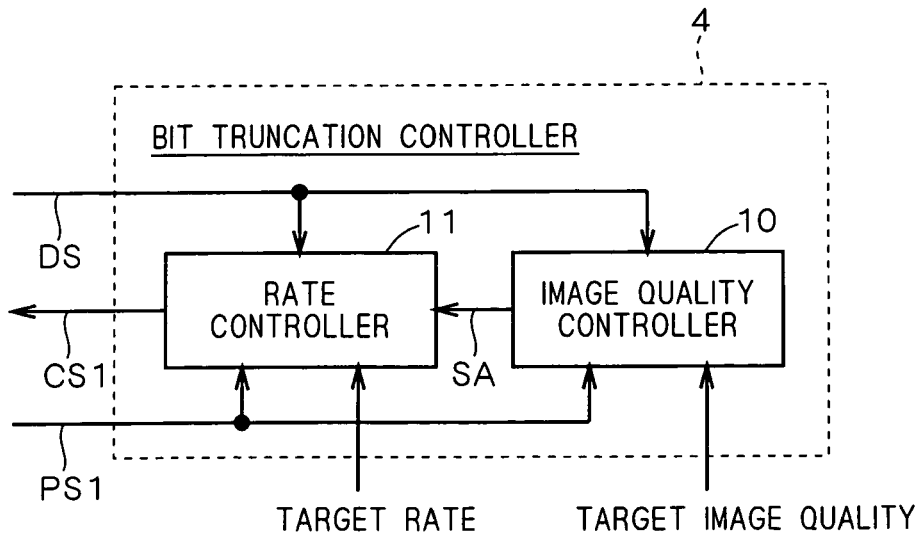
FIG. 2 is a functional block diagram showing a general configuration of a bit truncation controller in the rate control system shown in FIG. 1.

FIG. 2 is a functional block diagram showing a general configuration of the bit truncation controller 4 in the rate control system 1 shown in FIG. 1. The bit truncation controller 4 comprises an image-quality controller 10 for selecting a target to be coded according to target image quality; and a rate controller 11 for controlling a rate according to a target rate (or final rate). The rate controller 11, according to data structure information DS on an input bit stream provided from the MMU 3, calculates a truncation point appropriate to the target rate from the target to be coded selected by the image-quality controller 10, and generates and provides to the MMU 3 the readout control signal CS1 for reading out a part of a code sequence before the truncation point.

The layer splitting controller 7 shown in FIG. 1, according to the data structure information DS on the input bit stream provided from the MMU3, generates and outputs to the MMU 3 the readout control signal CS2 for generating an output bit stream which is divided into a plurality of layers.

The priority table 6 stores priorities which are determined by the number of recursive divisions into low-pass components according to the JPEG2000 standard, for each subband in compressed and encoded data contained in the input bit stream, and supplies priority data PS1 and PS2 to the bit truncation controller 4 and to the layer splitting controller 7.

The configuration and operation of the rate control system 1 with the aforementioned configuration will be described in detail below.

<First Technique for Priority Setting>

Figure 3:
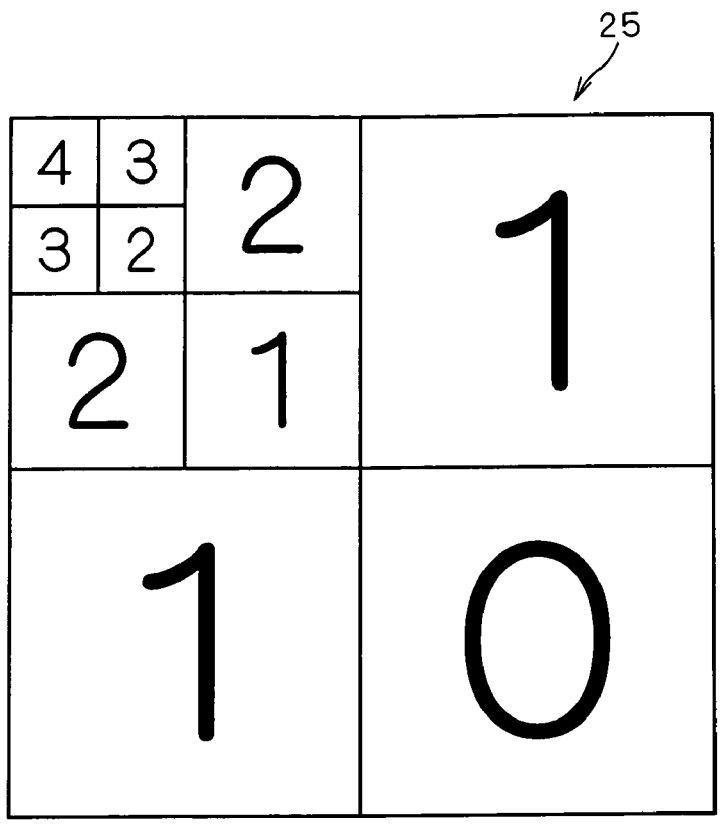
FIG. 3 is a schematic view showing a two-dimensional (2-D) image divided into subbands by the octave band splitting method.
Figure 24:
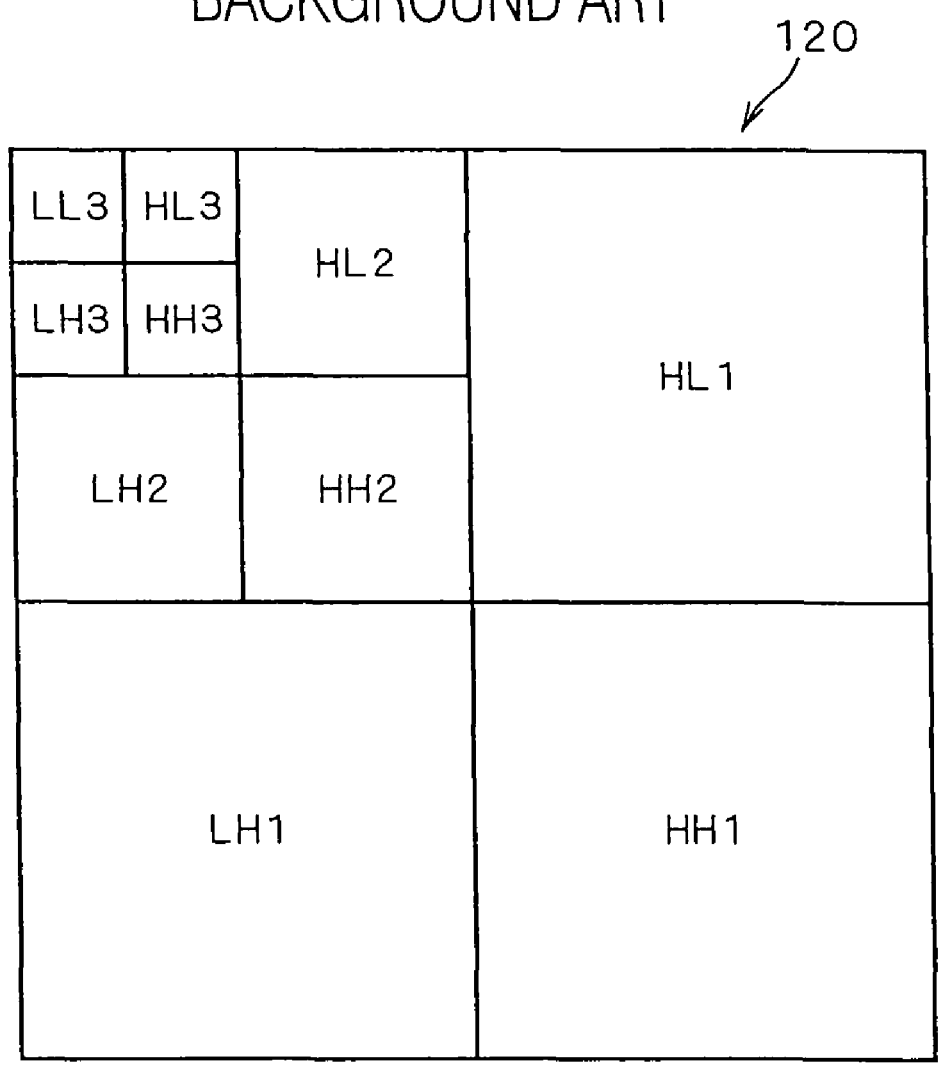
FIG. 24 is a schematic view showing a 2-D image divided into subbands by the octave band splitting method.
Figure 25:
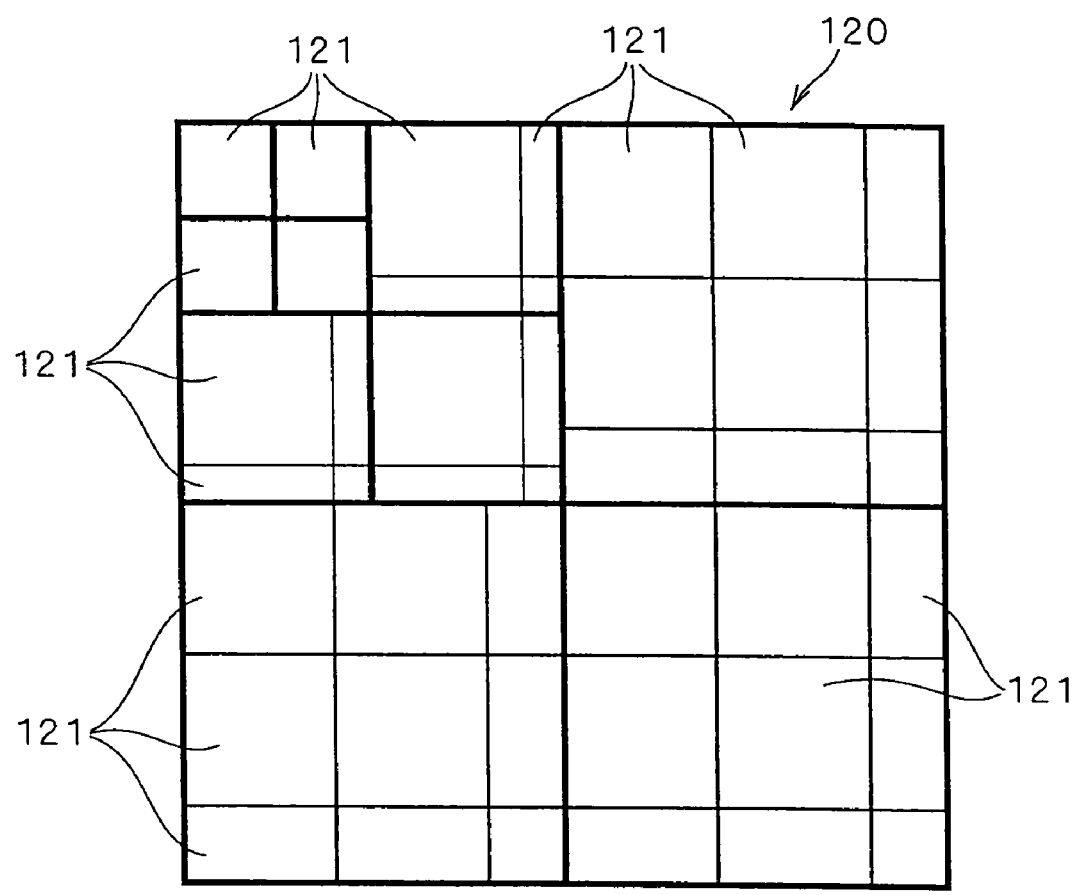
FIG. 25 is a schematic view showing a 2-D image decomposed into a plurality of code blocks.
Figure 2:
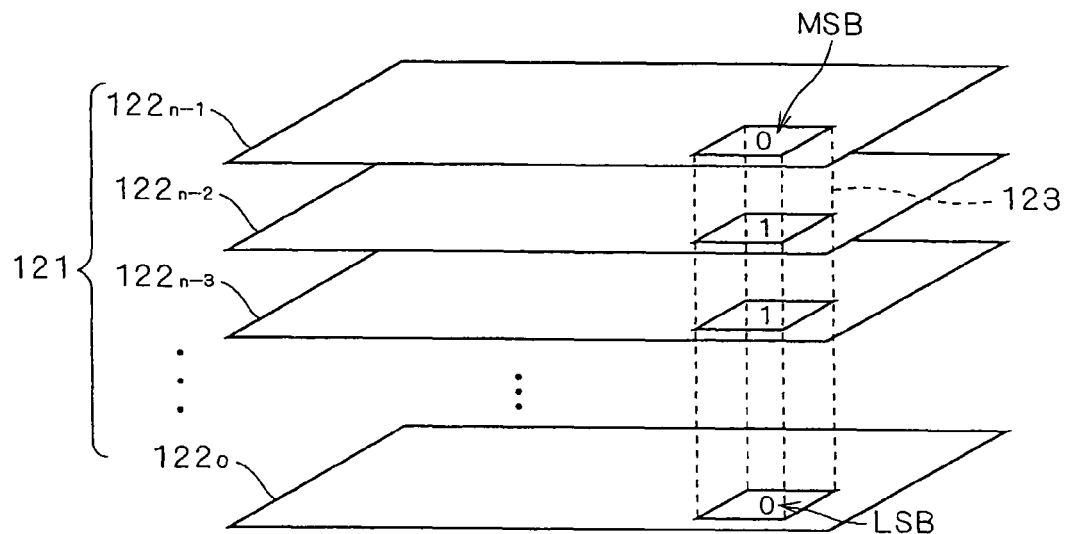
Figure 2:
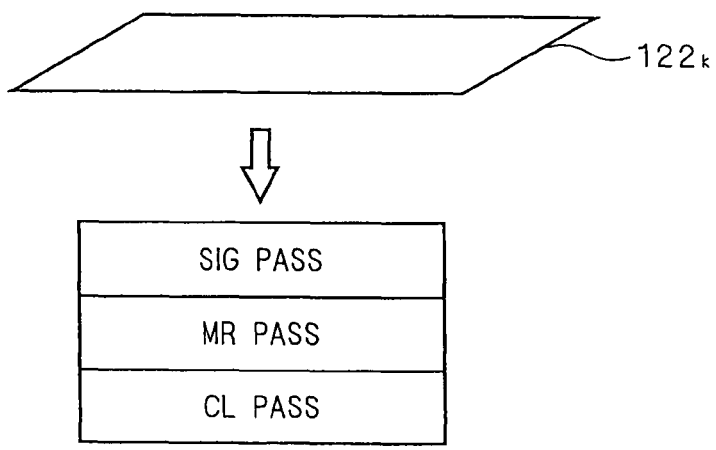

Now, one technique for setting priorities to be recorded in the above priority table 6 is described. According to the present invention, the priorities are determined for each subband by the number of recursive divisions into low-pass components. In the present preferred embodiment, the priorities of subbands HHn, HLn, LHn, and LLn of the n-th decomposition level (n is an integer of 1 or more) are determined to be n−1, (n−1)+1, (n−1)+1, and (n−1)+2, respectively. For example, the priorities of the subbands HH1 and LL3 in FIG. 24 are determined to be "0" and "4," respectively. FIG. 3 is a schematic view showing a 2-D image 25 divided into subbands according to the octave band splitting method. Each subband is given a priority of any one of "0," "1," "2," "3," and The priority table 6 records priority information which corresponds to each of the subbands HHn, HLn, LHn, and LLn. The image-quality controller 10, the rate controller 11, and the layer splitting controller 7 set priorities for each subband according to the priority data PS1 and PS2 obtained from the priority table 6. More specifically, entropy-coded transform coefficients (hereinafter simply referred to as "transform coefficients") in each subband are shifted by the number of bits corresponding to priorities, whereby the priorities are set for each subband. In this bit-shifting process, it is not necessary to actually perform a bit-shift operation on each transform coefficient, and instead only the position of each bit of each transform coefficient should be shifted virtually. In this case, there is no change in the position of the bit plane to which each bit of the transform coefficients belongs.

Figure 4:
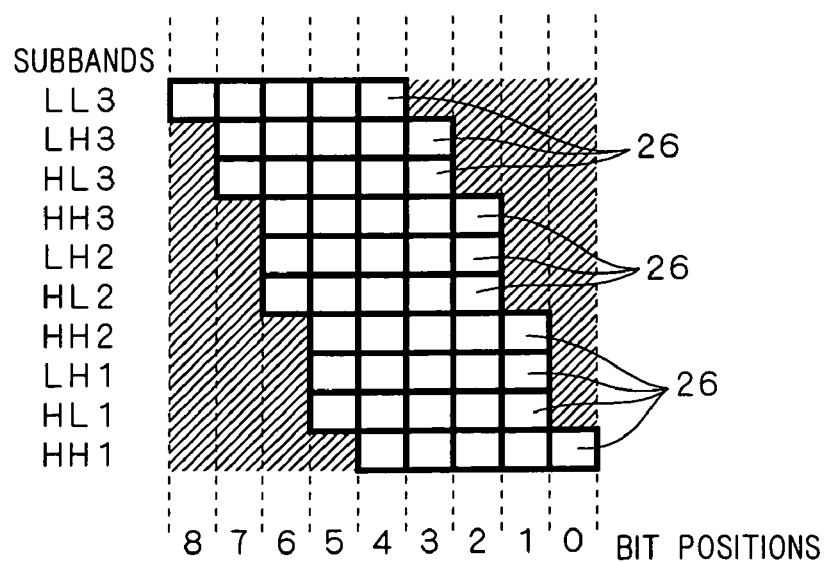
FIG. 4 is an explanatory diagram for priority setting by bit shifting.
Figure 5:
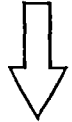
FIG. 5 illustrates bit-shifted transform coefficients.

FIG. 4 is an explanatory diagram for priority setting by bit shifting. In the example of FIG. 3, since the priority of the subband L13 is "4", appropriate transform coefficients 26 are shifted to the left by 4 bits. The transform coefficients 26 in the subbands HL3 and LH3 having the priority of "3" are shifted to the left by 3 bits; the transform coefficients 26 in the subbands HH3, HL2, and LH2 having the priority of "2" are shifted to the left by 2 bits; and the transform coefficients 26 in the subbands HH2, HL1, and LH1 having the priority of "1" are shifted to the left by 1 bit. At this time, as shown in FIG. 5, transform coefficients in a 2-D image 25A prior to bit shifting are changed into those shown in a 2-D image 25B by the aforementioned left bit shifting. For example, the transform coefficient value (=4) in the subband LL3 is converted into $4 \times 2^4 = 64$ by 4-bit shifting to the left.

Next, the reason (theoretical background) for setting priorities as above described is described below.

In the conventional R-D optimization method previously described, optimization is performed using distortion measures. According to the foregoing non-patent literature by David S. Taubman, et. al., a distortion measure $D_i^{(z)}$ can be calculated from the following equation (1):

$$D_i^{(z)} = G_{b\,[i]} \sum_j \left( oy_i^{K\,[i,j]}[j] - y_i[j] \right)^2, \qquad (1)$$

where $$K\,[i,j] = p_i^{(z)}[j]$$

In the above equation (1), z is the bit truncation point; $oy_i^{k[i,j]}[j]$ is the j-th sample value (coefficient value) of a code block which is inverse quantized in the K[i,j]-th bit plane; $y_i[j]$ is the j-th sample value (coefficient value) of that code block; and $G_b[i]$ is the squared norm of a synthesis filter coefficient for subband b[i], i.e., represents the weighting factor for a distortion model associated with that subband b[i]. For convenience of description, the notation of symbols in the above equation (1) differs slightly from that in the forgoing non-patent literature.

In R-D optimization, optimization is performed to minimize the sum of the distortion measures $D_i^{(z)}$ in subband b[i]. The weighting factor $G_b$ for subband b represents weighting to reduce image distortion.

The weighting factor $G_b$ for subband b is given by:

$$G_b = \|S_b\|^2, \text{ where } S_b = s_b[n] \qquad (2)$$

In the above equation (2), $s_b[n]$ is a 1-D synthesis filter coefficient for subband b, and $\|x\|$ is the norm of the vector x.

According to equations (4.39) and (4.40) given in the foregoing no-patent literature, a 1-D synthesis filter coefficient $S_{L[1]}[n]$ for the low-pass component L1 of the first decomposition level and a 1-D synthesis filter coefficient $S_{H[1]}[n]$ for the high-pass component H1 of the same decomposition level are calculated from the following equations (3):

$$\begin{cases} S_{L\,[1]}[n] = g_0[n] \\ S_{H\,[1]}[n] = g_1[n] \end{cases} \quad (3)$$

In the above equations (3), $g_0[n]$ and $g_1[n]$ are respectively low- and high-pass coefficients for a forward transform filter used in band splitting of an image signal.

Also, a 1-D synthesis filter coefficient $S_{L[d]}[n]$ for the low-pass component Ld of the d-th decomposition level (d=1, 2, ..., D) and a 1-D synthesis filter coefficient $S_{H[d]}[n]$ for the high-pass component Hd of the same decomposition level are calculated from the following equations (4):

$$\begin{cases} S_{L\,[d]}[n] = \sum_k S_{L\,[d-1]}[k]\,g_0[n-2k] \\ S_{H\,[d]}[n] = \sum_k S_{H\,[d-1]}[k]\,g_0[n-2k] \end{cases} \quad (4)$$

Then, the squared norm of the 1-D synthesis filter coefficient for the low-pass component Ld of the d-th decomposition level is calculated from the following equation (5):

$$G_{L\,[d]} = \|S_{L\,[d]}[n]\|^2 = \sum_j |S_{L\,[d]}[j]|^2 \quad (5)$$

Also, the squared norm of the 1-D synthesis filter coefficient for the high-pass component Hd can be calculated from a similar equation to the equation (5).

Then, 2-D synthesis filter coefficients for the subbands LLD, HLd, LHd, HHd of the d-th decomposition level (d=1, 2, ..., D; D is an integer value) can be expressed as the product of the above 1-D synthesis filter coefficients, and a 2-D weighting factor $G_b$ for subband b can be expressed as the product of the 1-D weighting factors. More specifically, the 2-D synthesis filter coefficients and the 2-D weighting factors can be calculated from the following equations (6):

$$\begin{cases} S_{LL\,[D]}[n_1, n_2] = S_{L\,[D]}[n_1]\,S_{L\,[D]}[n_2] \Rightarrow G_{LL\,[D]} = G_{L\,[D]} \cdot G_{L\,[D]} \\ S_{HL\,[d]}[n_1, n_2] = S_{L\,[d]}[n_1]\,S_{H\,[d]}[n_2] \Rightarrow G_{HL\,[d]} = G_{L\,[d]} \cdot G_{H\,[d]} \\ S_{LH\,[d]}[n_1, n_2] = S_{H\,[d]}[n_1]\,S_{L\,[d]}[n_2] \Rightarrow G_{LH\,[d]} = G_{H\,[d]} \cdot G_{L\,[d]} \\ S_{HH\,[d]}[n_1, n_2] = S_{H\,[d]}[n_1]\,S_{H\,[d]}[n_2] \Rightarrow G_{HH\,[d]} = G_{H\,[d]} \cdot G_{H\,[d]} \end{cases} \quad (6)$$

In the above equations (6), the subscripts LL[D], HL[d], LH[d], and HH[d] represent the subbands LLD, HLd, LHd, and HHd, respectively.

The square root of the weighting factor $G_b$ is the norm. TABLEs 1-4 below show the calculation results of the 2-D weighting factors $G_b$. TABLE 1 gives the numerical values of the squared norms of each subband for the 9/7 filter (9/7-tap filter), and TABLE 2 gives the numerical values of the norms corresponding to TABLE 1. Also, TABLE 3 gives the numerical values of the squared norms of each subband for the 5/3 filter (5/3-tap filter), and TABLE 4 gives the numerical values of the norms corresponding to TABLE 3.

TABLE 1

(Squared norms of) weighting coefficients G for distortion by 9/7 filter

| Decomposition Level | LL | HL | LH | HH |
|---|---|---|---|---|
| 1 | 3.86479 | 1.02270 | 1.02270 | 0.27063 |
| 2 | 16.99426 | 3.98726 | 3.98726 | 0.93551 |
| 3 | 70.84158 | 17.50056 | 17.50056 | 4.32330 |
| 4 | 286.81360 | 72.83113 | 72.83113 | 18.49415 |
| 5 | 1150.90066 | 294.69647 | 294.69647 | 75.45917 |
| 6 | 4607.30956 | 1182.34209 | 1182.34209 | 303.41630 |
| 7 | 18432.96262 | 4732.98083 | 4732.98083 | 1215.27440 |
| 8 | 73735.57967 | 18935.55202 | 18935.55202 | 4862.71528 |
| 9 | 294946.04918 | 75745.84127 | 75745.84127 | 19452.48118 |
| 10 | 1179787.92756 | 302986.99951 | 302986.99951 | 77811.54539 |
| 11 | 4719155.44117 | 1211951.63280 | 1211951.63280 | 311247.80240 |

TABLE 2

Norms of 9/7 filter

| Decomposition Level | LL | HL | LH | HH |
|---|---|---|---|---|
| 1 | 1.96591 | 1.01129 | 1.01129 | 0.52022 |
| 2 | 4.12241 | 1.99681 | 1.99681 | 0.96722 |
| 3 | 8.41674 | 4.18337 | 4.18337 | 2.07926 |
| 4 | 16.93557 | 8.53412 | 8.53412 | 4.30048 |
| 5 | 33.92493 | 17.16673 | 17.16673 | 8.68672 |
| 6 | 67.87717 | 34.38520 | 34.38520 | 17.41885 |
| 7 | 135.76805 | 68.79666 | 68.79666 | 34.86079 |
| 8 | 271.54296 | 137.60651 | 137.60651 | 69.73317 |
| 9 | 543.08936 | 275.21962 | 275.21962 | 139.47215 |
| 10 | 1086.18043 | 550.44255 | 550.44255 | 278.94721 |
| 11 | 2172.36172 | 1100.88675 | 1100.88675 | 557.89587 |

TABLE 3

(Squared norms of) weighting coefficients G for distortion by 5/3 filter

| Decomposition Level | LL | HL | LH | HH |
|---|---|---|---|---|
| 1 | 2.25000 | 1.07813 | 1.07813 | 0.51660 |
| 2 | 7.56250 | 2.53516 | 2.53516 | 0.84985 |
| 3 | 28.89063 | 8.52441 | 8.52441 | 2.51520 |
| 4 | 114.22266 | 32.52173 | 32.52173 | 9.25966 |
| 5 | 455.55566 | 128.52106 | 128.52106 | 36.25827 |
| 6 | 1820.88892 | 512.52089 | 512.52089 | 144.25793 |
| 7 | 7282.22223 | 2048.52085 | 2048.52085 | 576.25784 |
| 8 | 29127.55556 | 8192.52084 | 8192.52084 | 2304.25782 |
| 9 | 116508.88889 | 32768.52083 | 32768.52083 | 9216.25781 |
| 10 | 466034.22222 | 131072.52083 | 131072.52083 | 36864.25781 |
| 11 | 1864135.55556 | 524288.52083 | 524288.52083 | 147456.25781 |

TABLE 4

Norms of 5/3 filter

| Decomposition Level | LL | HL | LH | HH |
|---|---|---|---|---|
| 1 | 1.50000 | 1.03833 | 1.03833 | 0.71875 |
| 2 | 2.75000 | 1.59222 | 1.59222 | 0.92188 |
| 3 | 5.37500 | 2.91966 | 2.91966 | 1.58594 |
| 4 | 10.68750 | 5.70278 | 5.70278 | 3.04297 |
| 5 | 21.34375 | 11.33671 | 11.33671 | 6.02148 |
| 6 | 42.67188 | 22.63892 | 22.63892 | 12.01074 |
| 7 | 85.33594 | 45.26059 | 45.26059 | 24.00537 |
| 8 | 170.66797 | 90.51255 | 90.51255 | 48.00269 |
| 9 | 341.33398 | 181.02077 | 181.02077 | 96.00134 |
| 10 | 682.66699 | 362.03939 | 362.03939 | 192.00067 |
| 11 | 1365.33350 | 724.07770 | 724.07770 | 384.00034 |

Figure 6:
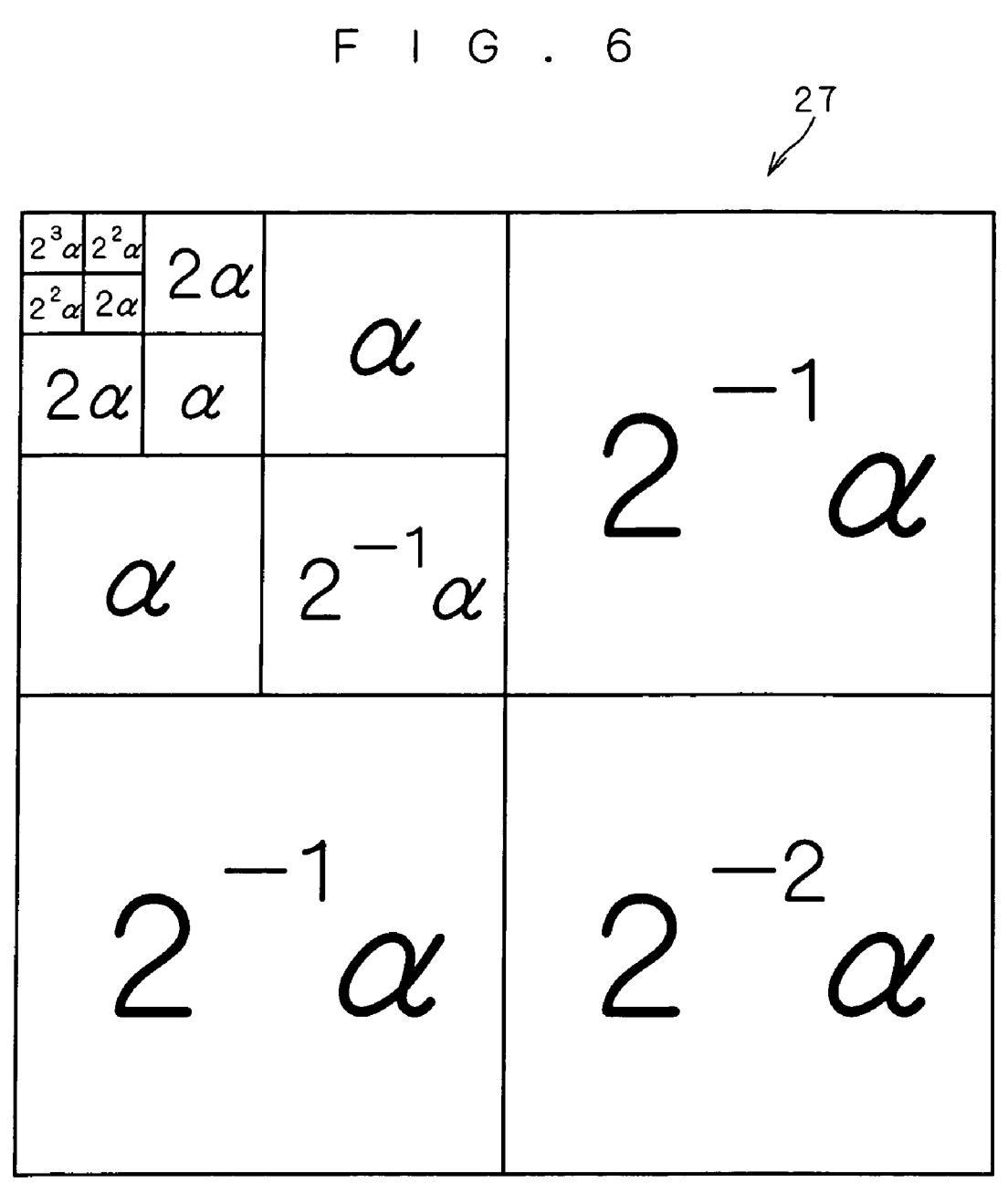

Further, if α is the norm of the low-pass component LL1 of the first decomposition level, the values as shown in FIG. 6 are set for each subband by using the norm α. A 2-D image 27 in FIG. 6 shows the 2-D image 120 divided into subbands according to the octave band splitting method. The set values for the subbands HHn, HLn, LHn, and LLn of the n-th decomposition level (n is an integer of 1 or more) are $2^{n-3} \times \alpha$, $2^{n-2} \times \alpha$, $2^{n-2} \times \alpha$, and $2^{n-1} \times \alpha$, respectively. For example, the set value for the subband LH1 is $2^{-1} \times \alpha$.

The above set values and the numerical values of the norms shown in TABLEs 2 and 4, when compared, are closely analogous. For example, in the case of TABLE 2 (α=1.96591), the "set values (and corresponding subbands)" shown in FIG. 6 are approximately 0.49 (HH1), approximately 0.98 (HL1, LH1, and HH2), approximately 1.96 (HL2, LH2, and HH3), approximately 3.93 (HL3 and LH3), and approximately 7.86 (LL3), which are found to be closely analogous to the numerical values of the norms shown in TABLE 2.

In FIG. 6, the values obtained by rounding the norm of the subband LL1 to α=2 and shifting the set value for each subband to the left by 1 bit, i.e., the values obtained by multiplying all the set values by $2^1$, are found to be in agreement with the priority values shown in FIG. 3. Thus, setting a priority for each subband as in the first technique for priority setting is approximately equivalent to multiplying a sample value (transform coefficient value) of each subband by the norm (or the square root of the weighting factor) of a filter used in R-D optimization. Accordingly, the priorities according to this preferred embodiment are determined in order to reduce image distortion.

<Second Technique for Priority Setting>

The technique for priority setting is not limited to the one described above and may of course be in the following form.

In this technique, a value obtained by dividing the norm or the square root of the above weighting factor $G_b$ for each subband by the norm of the horizontally and vertically low-pass component LL of the highest decomposition level is rounded to the appropriate power of 2, and the absolute value of the exponent of that power of 2 is set as a priority. More specifically, the priority p is calculated from p=|I[R[x/α]]|, where α is the norm of the horizontally and vertically low-pass component LL of the highest (n-th) decomposition level; x is the norm of the other subbands; R[y] is the function of the variable y which is rounded to the appropriate power of 2; m=I[$2^m$] is the function for calculating the exponent m of the powers of 2, i.e., $2^m$, of the variable y; and |y| is the absolute value of the variable y.

Figure 7:
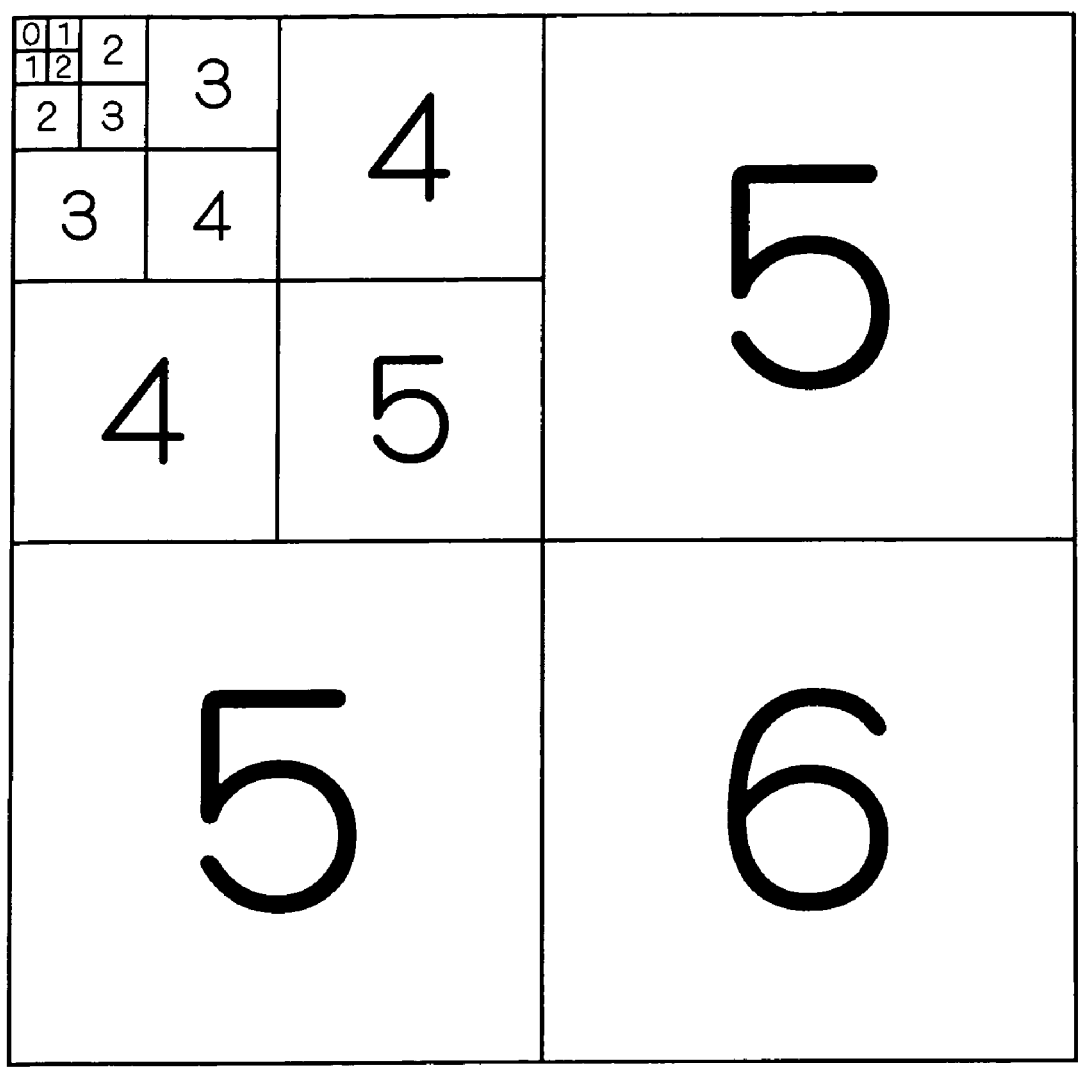

TABLE 5 below shows priorities calculated by using the norms of the 9/7 filter shown in TABLE 2 above. Here, the highest decomposition level is 5, and α=33.92493. Further, FIG. 7 shows a 2-D image 28 divided into subbands which are labeled with priorities shown in TABLE 5. The symbol X in the table indicates that the priority of that subband is not calculated.

TABLE 5

Priorities for 9/7 filter

| Decomposition Level | LL | HL | LH | HH |
|---|---|---|---|---|
| 1 | X | 5 | 5 | 6 |
| 2 | X | 4 | 4 | 5 |
| 3 | X | 3 | 3 | 4 |
| 4 | X | 2 | 2 | 3 |
| 5 | 0 | 1 | 1 | 2 |

Also, TABLE 6 below shows priorities calculated by using the norms of the 5/3 filter shown in TABLE 4 above.

TABLE 6

Priorities for 5/3 filter

| Decomposition Level | LL | HL | LH | HH |
|---|---|---|---|---|
| 1 | X | 4 | 4 | 5 |
| 2 | X | 4 | 4 | 5 |
| 3 | X | 3 | 3 | 4 |

TABLE 6-continued

Priorities for 5/3 filter

| Decomposition Level | LL | HL | LH | HH |
|---|---|---|---|---|
| 4 | X | 2 | 2 | 3 |
| 5 | 0 | 1 | 1 | 2 |

While, in the aforementioned first technique for priority setting, the priorities are set by shifting transform coefficients in each subband to the left by the number of bits corresponding to the priorities; in this technique, transform coefficients in each subband are shifted to the right by the number of bits corresponding to the priorities. This right bit shifting is done to increase the bit length of each transform coefficient. FIG. 8 is a schematic view showing transform coefficients 29 in the subbands which are shifted to the right by the number of bits corresponding to the priorities shown in FIG. 7.

<Third Technique for Priority Setting>

Next described is another technique for priority setting in consideration of human visual characteristics. When the priorities determined by the aforementioned second technique for priority setting are applied to a high-resolution image of approximately several million pixels, the image quality of a decoded image will be highly rated in objective evaluation, but it is not always rated so well in human visual evaluation. Thus, a priority setting technique in the present example adopts priorities which are assigned weights in consideration of the human visual characteristics. This allows the generation of compressed images with high display quality.

The foregoing non-patent literature describes in chapter 16 the weighted mean squared error (WMSE) based on the contrast sensitivity function (CSF) of the human visual system. According to this description, for improvement in human visual evaluation, the above equation (1) should desirably be rewritten as:

$$D_i^{(2)} = W_{b[i]}^{csf} G_{b[i]} \sum_j \left( oy_i^{K[i,j]}[j] - y_i[j] \right)^2 \quad (7)$$

In the above equation (7), $W_{b[i]}^{csf}$ is called the "energy weighting factor" for subband b[i], the recommended numerical value of which is described in ISO/IEC JTC 1/SC 29/WG1 (ITU-T SG8) N2406, "JPEG 2000 Part 1 FDIS (including COR 1, COR 2, and DCOR 3)," 4 Dec. 2001. FIGS. 9 through 11 show the numerical values of the "energy weighting factors" described in the above reference.

In FIGS. 9 to 11, "level" and "Lev" stand for the deposition level, and "Comp" stands for the luminance component Y and the color difference components Cb and Cr. Examples are shown for viewing distances of 1000, 1700, 2000, 3000, and 4000. The "Viewing distance 1000," "Viewing distance 1700," "Viewing distance 2000," "Viewing distance 3000," and "Viewing distance 4000", respectively, represent viewing distances when displays or prints of 100 dpi, 170 dpi, 200 dpi, 300 dpi, and 400 dpi are viewed from 10 inches away.

Using the numerical values shown in FIGS. 9-11, the square root of the weighting factor $(W_{b[i]}^{csf} \cdot G_{b[i]})^{1/2}$ in the above equation (7) is calculated. The calculation results are shown in TABLEs 7-18 below. TABLEs 7-9 give numerical values for monochrome imagery with the 9/7 filter, calculated by using the numerical values shown in FIG. 9; TABLEs 10-12 give numerical values for color imagery with the 9/7 filter, calculated by using the numerical values shown in FIGS. 10 and 11; TABLEs 13-15 give numerical values for monochrome imagery with the 5/3 filter, calculated by using the numerical values shown in FIG. 9; and TABLEs 16-18 give numerical values for color imagery with the 5/3 filter, calculated by using the numerical values shown in FIGS. 10 and 11.

TABLE 7

Numerical values for monochrome imagery with 9/7 filter

| Decomposition Level | Viewing distance 1000 | | | |
|---|---|---|---|---|
| | LL | HL | LH | HH |
| 1 | X | 0.567135 | 0.567135 | 0.147832 |
| 2 | X | 1.996812 | 1.996812 | 0.703332 |
| 3 | X | 4.183367 | 4.183367 | 2.079256 |
| 4 | X | 8.534116 | 8.534116 | 4.300482 |
| 5 | 33.92493 | 17.16673 | 17.16673 | 8.686724 |

TABLE 8

Numerical values for monochrome imagery with 9/7 filter

| Decomposition Level | Viewing distance 2000 | | | |
|---|---|---|---|---|
| | LL | HL | LH | HH |
| 1 | X | 0.180509 | 0.180509 | 0.022698 |
| 2 | X | 1.119894 | 1.119894 | 0.274876 |
| 3 | X | 4.183367 | 4.183367 | 1.512041 |
| 4 | X | 8.534116 | 8.534116 | 4.300482 |
| 5 | 33.92493 | 17.16673 | 17.16673 | 8.686724 |

TABLE 9

Numerical values for monochrome imagery with 9/7 filter

| Decomposition Level | Viewing distance 4000 | | | |
|---|---|---|---|---|
| | LL | HL | LH | HH |
| 1 | X | 0.014941 | 0.014941 | 0.000298 |
| 2 | X | 0.358645 | 0.358645 | 0.042464 |
| 3 | X | 2.360858 | 2.360858 | 0.594601 |
| 4 | X | 8.534116 | 8.534116 | 3.146525 |
| 5 | 33.92493 | 17.16673 | 17.16673 | 8.686724 |

TABLE 10

Numerical values for color imagery with 9/7 filter

| | Decomposition Level | Viewing distance 1000 | | | |
|---|---|---|---|---|---|
| | | LL | HL | LH | HH |
| Y | 1 | X | 0.76489 | 0.76489 | 0.298115 |
| | 2 | X | 1.99337 | 1.99337 | 0.963884 |
| | 3 | X | 4.183367 | 4.183367 | 2.079256 |
| | 4 | X | 8.534116 | 8.534116 | 4.300482 |
| | 5 | 33.92493 | 17.16673 | 17.16673 | 8.686724 |
| Cb | 1 | X | 0.233105 | 0.233105 | 0.059194 |
| | 2 | X | 0.900041 | 0.900041 | 0.299041 |
| | 3 | X | 2.721205 | 2.721205 | 1.10554 |
| | 4 | X | 6.77171 | 6.77171 | 3.063212 |
| | 5 | 33.92493 | 15.16158 | 15.16158 | 7.241097 |
| Cr | 1 | X | 0.33996 | 0.33996 | 0.104307 |
| | 2 | X | 1.10404 | 1.10404 | 0.405203 |
| | 3 | X | 3.03569 | 3.03569 | 1.299749 |
| | 4 | X | 7.177464 | 7.177464 | 3.337948 |
| | 5 | 33.92493 | 15.63678 | 15.63678 | 7.578107 |

TABLE 11

Numerical values for color imagery with 9/7 filter

| Decomposition | | Viewing distance 1700 | | | |
|---|---|---|---|---|---|
| | Level | LL | HL | LH | HH |
| Y | 1 | X | 0.310658 | 0.310658 | 0.056662 |
| | 2 | X | 1.72044 | 1.72044 | 0.718005 |
| | 3 | X | 4.183367 | 4.183367 | 2.079256 |
| | 4 | X | 8.534116 | 8.534116 | 4.300482 |
| | 5 | 33.92493 | 17.16673 | 17.16673 | 8.686724 |
| Cb | 1 | X | 0.09892 | 0.09892 | 0.01622 |
| | 2 | X | 0.559243 | 0.559243 | 0.147297 |
| | 3 | X | 2.098595 | 2.098595 | 0.753271 |
| | 4 | X | 5.883453 | 5.883453 | 2.490925 |
| | 5 | 33.92493 | 14.05553 | 14.05553 | 6.47921 |
| Cr | 1 | X | 0.179438 | 0.179438 | 0.040124 |
| | 2 | X | 0.775746 | 0.775746 | 0.240417 |
| | 3 | X | 2.5039 | 2.5039 | 0.979107 |
| | 4 | X | 6.465668 | 6.465668 | 2.86391 |
| | 5 | 33.92493 | 14.77858 | 14.77858 | 6.976933 |

TABLE 12

Numerical values for color imagery with 9/7 filter

| Decomposition | | Viewing distance 3000 | | | |
|---|---|---|---|---|---|
| | Level | LL | HL | LH | HH |
| Y | 1 | X | 0.038921 | 0.038921 | 0.0016 |
| | 2 | X | 0.819947 | 0.819947 | 0.176768 |
| | 3 | X | 3.85307 | 3.85307 | 1.763882 |
| | 4 | X | 8.534116 | 8.534116 | 4.300482 |
| | 5 | 33.92493 | 17.16673 | 17.16673 | 8.686724 |
| Cb | 1 | X | 0.023571 | 0.023571 | 0.001776 |
| | 2 | X | 0.247647 | 0.247647 | 0.043245 |
| | 3 | X | 1.337728 | 1.337728 | 0.385929 |
| | 4 | X | 4.603618 | 4.603618 | 1.734612 |
| | 5 | 33.92493 | 12.31002 | 12.31002 | 5.331711 |
| Cr | 1 | X | 0.060957 | 0.060957 | 0.007791 |
| | 2 | X | 0.423067 | 0.423067 | 0.097358 |
| | 3 | X | 1.793238 | 1.793238 | 0.597979 |
| | 4 | X | 5.39042 | 5.39042 | 2.192081 |
| | 5 | 33.92493 | 13.39161 | 13.39161 | 6.038385 |

TABLE 13

Numerical values for monochrome imagery with 5/3 filter

| Decomposition | Viewing distance 1000 | | | |
|---|---|---|---|---|
| Level | LL | HL | LH | HH |
| 1 | X | 0.5823 | 0.5823 | 0.204249 |
| 2 | X | 1.592217 | 1.592217 | 0.670362 |
| 3 | X | 2.91966 | 2.91966 | 1.585938 |
| 4 | X | 5.702783 | 5.702783 | 3.042969 |
| 5 | 21.34375 | 11.33671 | 11.33671 | 6.021484 |

TABLE 14

Numerical values for monochrome imagery with 5/3 filter

| Decomposition | Viewing distance 2000 | | | |
|---|---|---|---|---|
| Level | LL | HL | LH | HH |
| 1 | X | 0.185335 | 0.185335 | 0.03136 |
| 2 | X | 0.892981 | 0.892981 | 0.26199 |
| 3 | X | 2.91966 | 2.91966 | 1.153299 |
| 4 | X | 5.702783 | 5.702783 | 3.042969 |
| 5 | 21.34375 | 11.33671 | 11.33671 | 6.021484 |

TABLE 15

Numerical values for monochrome imagery with 5/3 filter

| Decomposition | Viewing distance 4000 | | | |
|---|---|---|---|---|
| Level | LL | HL | LH | HH |
| 1 | X | 0.01534 | 0.01534 | 0.000412 |
| 2 | X | 0.285977 | 0.285977 | 0.040473 |
| 3 | X | 1.647693 | 1.647693 | 0.453527 |
| 4 | X | 5.702783 | 5.702783 | 2.226443 |
| 5 | 21.34375 | 11.33671 | 11.33671 | 6.021484 |

TABLE 16

Numerical values for color imagery with 5/3 filter

| Decomposition | | Viewing distance 1000 | | | |
|---|---|---|---|---|---|
| | Level | LL | HL | LH | HH |
| Y | 1 | X | 0.785342 | 0.785342 | 0.411885 |
| | 2 | X | 1.589472 | 1.589472 | 0.918699 |
| | 3 | X | 2.91966 | 2.91966 | 1.585938 |
| | 4 | X | 5.702783 | 5.702783 | 3.042969 |
| | 5 | 21.34375 | 11.33671 | 11.33671 | 6.021484 |
| Cb | 1 | X | 0.239338 | 0.239338 | 0.081784 |
| | 2 | X | 0.717674 | 0.717674 | 0.285023 |
| | 3 | X | 1.899186 | 1.899186 | 0.843243 |
| | 4 | X | 4.525084 | 4.525084 | 2.167491 |
| | 5 | 21.34375 | 10.01254 | 10.01254 | 5.019401 |
| Cr | 1 | X | 0.349051 | 0.349051 | 0.144114 |
| | 2 | X | 0.880339 | 0.880339 | 0.386208 |
| | 3 | X | 2.118672 | 2.118672 | 0.991374 |
| | 4 | X | 4.796223 | 4.796223 | 2.361891 |
| | 5 | 21.34375 | 10.32635 | 10.32635 | 5.25301 |

TABLE 17

Numerical values for color imagery with 5/3 filter

| Decomposition | | Viewing distance 1700 | | | |
|---|---|---|---|---|---|
| | level | LL | HL | LH | HH |
| Y | 1 | X | 0.318965 | 0.318965 | 0.078286 |
| | 2 | X | 1.371843 | 1.371843 | 0.684347 |
| | 3 | X | 2.91966 | 2.91966 | 1.585938 |
| | 4 | X | 5.702783 | 5.702783 | 3.042969 |
| | 5 | 21.34375 | 11.33671 | 11.33671 | 6.021484 |
| Cb | 1 | X | 0.101565 | 0.101565 | 0.02241 |
| | 2 | X | 0.445929 | 0.445929 | 0.140392 |
| | 3 | X | 1.464653 | 1.464653 | 0.574552 |
| | 4 | X | 3.931521 | 3.931521 | 1.762548 |
| | 5 | 21.34375 | 9.282115 | 9.282115 | 4.491275 |
| Cr | 1 | X | 0.184236 | 0.184236 | 0.055437 |
| | 2 | X | 0.618564 | 0.618564 | 0.229147 |
| | 3 | X | 1.747524 | 1.747524 | 0.746807 |
| | 4 | X | 4.320576 | 4.320576 | 2.026468 |
| | 5 | 21.34375 | 9.759606 | 9.759606 | 4.836288 |

TABLE 18

Numerical values for color imagery with 5/3 filter

| | Decomposition Level | Viewing distance 3000 | | | |
|---|---|---|---|---|---|
| | | LL | HL | LH | HH |
| Y | 1 | X | 0.039962 | 0.039962 | 0.00221 |
| | 2 | X | 0.653809 | 0.653809 | 0.168482 |
| | 3 | X | 2.689138 | 2.689138 | 1.345389 |
| | 4 | X | 5.702783 | 5.702783 | 3.042969 |
| | 5 | 21.34375 | 11.33671 | 11.33671 | 6.021484 |
| Cb | 1 | X | 0.024201 | 0.024201 | 0.002453 |
| | 2 | X | 0.197468 | 0.197468 | 0.041218 |
| | 3 | X | 0.933628 | 0.933628 | 0.294364 |
| | 4 | X | 3.076292 | 3.076292 | 1.227391 |
| | 5 | 21.34375 | 8.129398 | 8.129398 | 3.695849 |
| Cr | 1 | X | 0.062587 | 0.062587 | 0.010765 |
| | 2 | X | 0.337345 | 0.337345 | 0.092794 |
| | 3 | X | 1.251539 | 1.251539 | 0.456105 |
| | 4 | X | 3.60206 | 3.60206 | 1.551089 |
| | 5 | 21.34375 | 8.843668 | 8.843668 | 4.185702 |

Then, using the numerical values given in TABLEs 7-18, the priority of each subband is calculated through the same procedure as described in the aforementioned second technique for priority setting. That is, the priority p is calculated from $p=|I[R[x/\alpha]]|$, where $\alpha$ is the numerical value of the horizontally and vertically low-pass component $LL_n$ of the highest (n-th) decomposition level; x is the numerical value of the other subbands; R[y] is the function of the variable y which is rounded to the appropriate power of 2; $m=I\lfloor 2^m \rfloor$ is the function for calculating the exponent m of the powers of 2, i.e., $2^m$, of the variable y; and |y| is the absolute value of the variable y.

TABLEs 19-30 below show the priority values. The priorities shown in TABLEs 19-30 are calculated by using the numerical values given in TABLEs 7-18 above, respectively.

TABLE 19

Priority table for monochrome imagery with 9/7 filter

| Decomposition Level | Viewing distance 1000 | | | |
|---|---|---|---|---|
| | LL | HL | LH | HH |
| 1 | X | 6 | 6 | 8 |
| 2 | X | 4 | 4 | 6 |
| 3 | X | 3 | 3 | 4 |
| 4 | X | 2 | 2 | 3 |
| 5 | 0 | 1 | 1 | 2 |

TABLE 20

Priority table for monochrome imagery with 9/7 filter

| Decomposition Level | Viewing distance 2000 | | | |
|---|---|---|---|---|
| | LL | HL | LH | HH |
| 1 | X | 8 | 8 | 11 |
| 2 | X | 5 | 5 | 7 |
| 3 | X | 3 | 3 | 5 |
| 4 | X | 2 | 2 | 3 |
| 5 | 0 | 1 | 1 | 2 |

TABLE 21

Priority table for monochrome imagery with 9/7 filter

| Decomposition Level | Viewing distance 4000 | | | |
|---|---|---|---|---|
| | LL | HL | LH | HH |
| 1 | X | 11 | 11 | 17 |
| 2 | X | 7 | 7 | 10 |
| 3 | X | 4 | 4 | 6 |
| 4 | X | 2 | 2 | 4 |
| 5 | 0 | 1 | 1 | 2 |

TABLE 22

Priority table for color imagery with 9/7 filter

| | Decomposition Level | Viewing distance 1000 | | | |
|---|---|---|---|---|---|
| | | LL | HL | LH | HH |
| Y | 1 | X | 6 | 6 | 7 |
| | 2 | X | 4 | 4 | 5 |
| | 3 | X | 3 | 3 | 4 |
| | 4 | X | 2 | 2 | 3 |
| | 5 | 0 | 1 | 1 | 2 |
| Cb | 1 | X | 7 | 7 | 9 |
| | 2 | X | 5 | 5 | 7 |
| | 3 | X | 4 | 4 | 5 |
| | 4 | X | 2 | 2 | 4 |
| | 5 | 0 | 1 | 1 | 2 |
| Cr | 1 | X | 7 | 7 | 8 |
| | 2 | X | 5 | 5 | 6 |
| | 3 | X | 4 | 4 | 5 |
| | 4 | X | 2 | 2 | 3 |
| | 5 | 0 | 1 | 1 | 2 |

TABLE 23

Priority table for color imagery with 9/7 filter

| | Decomposition Level | Viewing distance 1700 | | | |
|---|---|---|---|---|---|
| | | LL | HL | LH | HH |
| Y | 1 | X | 7 | 7 | 9 |
| | 2 | X | 4 | 4 | 6 |
| | 3 | X | 3 | 3 | 4 |
| | 4 | X | 2 | 2 | 3 |
| | 5 | 0 | 1 | 1 | 2 |
| Cb | 1 | X | 9 | 9 | 11 |
| | 2 | X | 6 | 6 | 8 |
| | 3 | X | 4 | 4 | 6 |
| | 4 | X | 3 | 3 | 4 |
| | 5 | 0 | 1 | 1 | 2 |
| Cr | 1 | X | 8 | 8 | 10 |
| | 2 | X | 6 | 6 | 7 |
| | 3 | X | 4 | 4 | 5 |
| | 4 | X | 2 | 2 | 4 |
| | 5 | 0 | 1 | 1 | 2 |

TABLE 24

Priority table for color imagery with 9/7 filter

| | Decomposition Level | Viewing distance 3000 | | | |
|---|---|---|---|---|---|
| | | LL | HL | LH | HH |
| Y | 1 | X | 10 | 10 | 14 |
| | 2 | X | 5 | 5 | 8 |
| | 3 | X | 3 | 3 | 4 |
| | 4 | X | 2 | 2 | 3 |

TABLE 24-continued

Priority table for color imagery with 9/7 filter

| Decomposition | | Viewing distance 3000 | | | |
|---|---|---|---|---|---|
| | Level | LL | HL | LH | HH |
| | 5 | 0 | 1 | 1 | 2 |
| Cb | 1 | X | 11 | 11 | 14 |
| | 2 | X | 7 | 7 | 10 |
| | 3 | X | 5 | 5 | 7 |
| | 4 | X | 3 | 3 | 4 |
| | 5 | 0 | 2 | 2 | 3 |
| Cr | 1 | X | 9 | 9 | 12 |
| | 2 | X | 6 | 6 | 9 |
| | 3 | X | 4 | 4 | 6 |
| | 4 | X | 3 | 3 | 4 |
| | 5 | 0 | 1 | 1 | 3 |

TABLE 25

Priority table for monochrome imagery with 5/3 filter

| Decomposition | Viewing distance 1000 | | | |
|---|---|---|---|---|
| Level | LL | HL | LH | HH |
| 1 | X | 5 | 5 | 7 |
| 2 | X | 4 | 4 | 5 |
| 3 | X | 3 | 3 | 4 |
| 4 | X | 2 | 2 | 3 |
| 5 | 0 | 1 | 1 | 2 |

TABLE 26

Priority table for monochrome imagery with 5/3 filter

| Decomposition | Viewing distance 2000 | | | |
|---|---|---|---|---|
| Level | LL | HL | LH | HH |
| 1 | X | 7 | 7 | 9 |
| 2 | X | 5 | 5 | 6 |
| 3 | X | 3 | 3 | 4 |
| 4 | X | 2 | 2 | 3 |
| 5 | 0 | 1 | 1 | 2 |

TABLE 27

Priority table for monochrome imagery with 5/3 filter

| Decomposition | Viewing distance 4000 | | | |
|---|---|---|---|---|
| Level | LL | HL | LH | HH |
| 1 | X | 11 | 11 | 16 |
| 2 | X | 6 | 6 | 9 |
| 3 | X | 4 | 4 | 6 |
| 4 | X | 2 | 2 | 3 |
| 5 | 0 | 1 | 1 | 2 |

TABLE 28

Priority table for color imagery with 5/3 filter

| Decomposition | | Viewing distance 1000 | | | |
|---|---|---|---|---|---|
| | Level | LL | HL | LH | HH |
| Y | 1 | X | 5 | 5 | 6 |
| | 2 | X | 4 | 4 | 5 |

TABLE 28-continued

Priority table for color imagery with 5/3 filter

| Decomposition | | Viewing distance 1000 | | | |
|---|---|---|---|---|---|
| | Level | LL | HL | LH | HH |
| | 3 | X | 3 | 3 | 4 |
| | 4 | X | 2 | 2 | 3 |
| | 5 | 0 | 1 | 1 | 2 |
| Cb | 1 | X | 7 | 7 | 8 |
| | 2 | X | 5 | 5 | 6 |
| | 3 | X | 4 | 4 | 5 |
| | 4 | X | 2 | 2 | 3 |
| | 5 | 0 | 1 | 1 | 2 |
| Cr | 1 | X | 6 | 6 | 7 |
| | 2 | X | 5 | 5 | 6 |
| | 3 | X | 3 | 3 | 5 |
| | 4 | X | 2 | 2 | 3 |
| | 5 | 0 | 1 | 1 | 2 |

TABLE 29

Priority table for color imagery with 5/3 filter

| Decomposition | | Viewing distance 1700 | | | |
|---|---|---|---|---|---|
| | Level | LL | HL | LH | HH |
| Y | 1 | X | 6 | 6 | 8 |
| | 2 | X | 4 | 4 | 5 |
| | 3 | X | 3 | 3 | 4 |
| | 4 | X | 2 | 2 | 3 |
| | 5 | 0 | 1 | 1 | 2 |
| Cb | 1 | X | 8 | 8 | 10 |
| | 2 | X | 6 | 6 | 7 |
| | 3 | X | 4 | 4 | 5 |
| | 4 | X | 3 | 3 | 4 |
| | 5 | 0 | 1 | 1 | 2 |
| Cr | 1 | X | 7 | 7 | 9 |
| | 2 | X | 5 | 5 | 7 |
| | 3 | X | 4 | 4 | 5 |
| | 4 | X | 2 | 2 | 3 |
| | 5 | 0 | 1 | 1 | 2 |

TABLE 30

Priority table for color imagery with 5/3 filter

| Decomposition | | Viewing distance 3000 | | | |
|---|---|---|---|---|---|
| | Level | LL | HL | LH | HH |
| Y | 1 | X | 9 | 9 | 13 |
| | 2 | X | 5 | 5 | 7 |
| | 3 | X | 3 | 3 | 4 |
| | 4 | X | 2 | 2 | 3 |
| | 5 | 0 | 1 | 1 | 2 |
| Cb | 1 | X | 10 | 10 | 13 |
| | 2 | X | 7 | 7 | 9 |
| | 3 | X | 5 | 5 | 6 |
| | 4 | X | 3 | 3 | 4 |
| | 5 | 0 | 1 | 1 | 3 |
| Cr | 1 | X | 8 | 8 | 11 |
| | 2 | X | 6 | 6 | 8 |
| | 3 | X | 4 | 4 | 6 |
| | 4 | X | 3 | 3 | 4 |
| | 5 | 0 | 1 | 1 | 2 |

In the present example, as in the aforementioned second technique for priority setting, the priorities are set for transform coefficients in each subband by shifting those transform coefficients to the right by the number of bits corresponding to the priorities given in TABLEs 19-30 above. This allows priority setting in consideration of the human visual characteristics.

<Image Quality Control>

Figure 12:
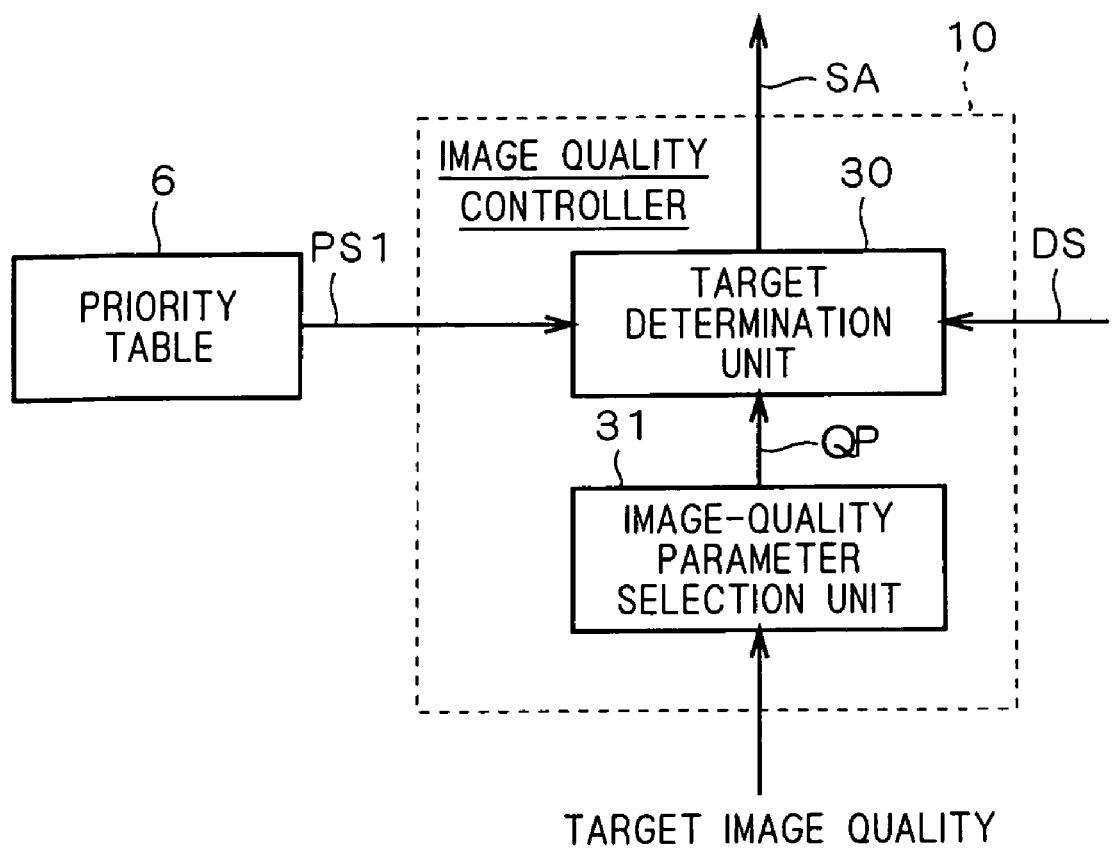
FIG. 12 is a functional block diagram showing a general configuration of an image-quality controller according to the preferred embodiment of the present invention.

Next, the configuration and processing details of the image-quality controller 10 shown in FIG. 2 are described. FIG. 12 is a functional block diagram showing a general configuration of the image-quality controller 10.

The image-quality controller 10 comprises an image-quality parameter selection unit 31 for, on the basis of target image quality (high quality, standard quality, low quality, resolution information, etc.), selecting and outputting an appropriate image-quality parameter QP for the target image quality from a plurality of image-quality parameters; and a target determination unit 30 for determining a target to be coded. The target determination unit 30 sets the aforementioned priorities for each subband in compressed image data contained in the input bit stream, according to the priority data PS1 obtained from the priority table 6. Also, the target determination unit 30 determines, according to the set priorities, a target to be coded which is appropriate to target image quality specified by the image-quality parameter QP, and generates and outputs scanning area information SA.

Figure 13:
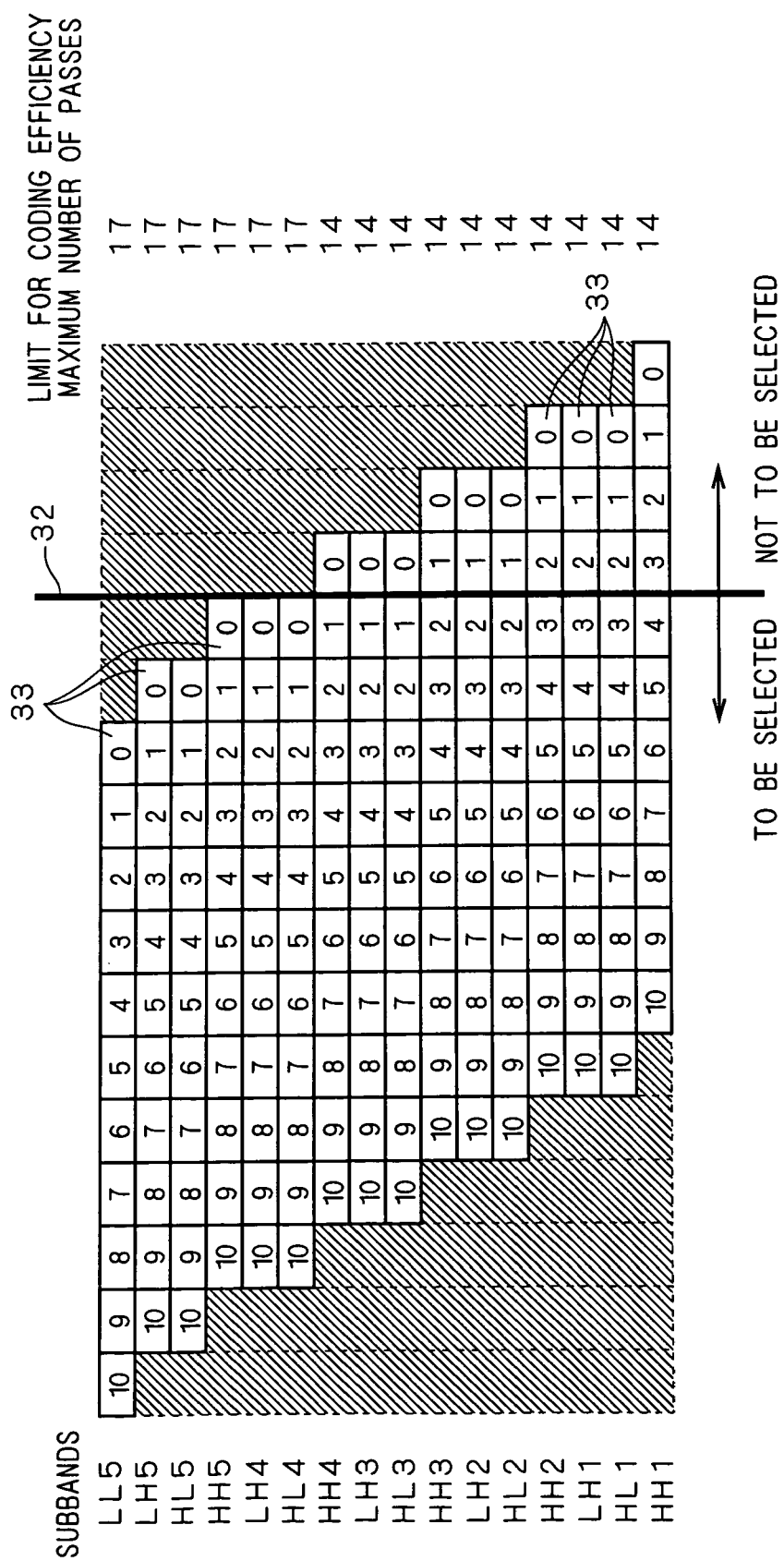
FIG. 13 is a schematic view illustrating transform coefficients which are bit shifted according to priorities.

The following is a description of a method of determining a target to be coded in the target determination unit 30. FIG. 13 is a schematic view illustrating transform coefficients 33 which are bit shifted according to priorities. The numbers 0 through 10 on each bit of the transform coefficients 33 indicate a number of a bit plane to which that bit belongs. Here, the least significant bit number is 0, and the most significant bit number is 10.

The target determination unit 30 sets a coding end line 32 according to the image-quality parameter QP and generates the scanning area information SA so that the high-order bits on the left side of the coding end line 32 are determined as a target to be coded and the low-order bits on the right side of the line 32 are excluded from the target to be coded. This allows efficient selection of a target to be coded. As a result, the rate controller 11 receiving the scanning area information SA scans only the high-order bit planes on the left side of the coding end line 32 in each code block and truncates the low-order bit planes on the right side of the line 32.

The target determination unit 30 can further determine a target to be coded on a coding-pass-by-coding-pass basis according to the image-quality parameter QP. The image-quality parameter QP includes a group of parameters which indicate the limit for the number of bit planes to be coded and the limit for the number of coding passes (CL, SIG, and MR passes) to be coded. TABLE 31 below shows, by way of example, image-quality parameters QP appropriate to an image having a resolution of 2048×2560 pixels. Since the resolution of the horizontally and vertically low-pass subband needs to be reduced to 128×128 pixels or less, the fifth or more decomposition level is necessary.

TABLE 31

Examples of image-quality parameters

| Subbands | Limit for Priority | | Limit for Coding Efficiency |
|---|---|---|---|
| | Number of Bit Planes | Pass Name | Maximum Number of Passes |
| LL5 | 0 | CL | 17 |
| LH5 | 0 | CL | 17 |
| HL5 | 0 | CL | 17 |

TABLE 31-continued

Examples of image-quality parameters

| Subbands | Limit for Priority | | Limit for Coding Efficiency |
|---|---|---|---|
| | Number of Bit Planes | Pass Name | Maximum Number of Passes |
| HH5 | 0 | CL | 17 |
| LH4 | 0 | CL | 17 |
| HL4 | 0 | CL | 17 |
| HH4 | 1 | MR | 14 |
| LH3 | 1 | MR | 14 |
| HL3 | 1 | MR | 14 |
| HH3 | 2 | SIG | 14 |
| HL2 | 2 | SIG | 14 |
| LH2 | 2 | SIG | 14 |
| HH2 | 3 | SIG | 14 |
| LH1 | 3 | SIG | 14 |
| HL1 | 3 | SIG | 14 |
| HH1 | 4 | CL | 14 |

CL: Cleanup pass
MR: Magnitude Refinement pass
SIG: Significant propagation pass In TABLE 31, "Number of Bit Planes" stands for the number of low-order bit planes to be truncated on the right side of the coding end line 32 in FIG. 13; "Pass Name" stands for the last coding pass of the target to be coded; and "Maximum Number of Passes" stands for the upper limit of the number of coding passes to be coded.

Figure 14:
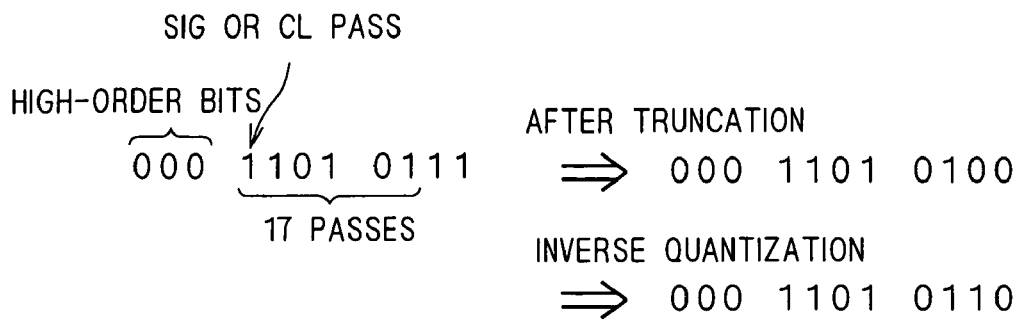
FIGS. 14 and 15 are explanatory diagrams for examples of coding transform coefficients in subband LL5.

One example of processing when FIG. 13 and TABLE 31 are applied is described below. FIG. 14 illustrates "$00011010111_2 = 215_{10}$" ($Y_2$ is the binary value Y; $X_{10}$ is the decimal value X) as one transform coefficient 33 in the subband LL5. As shown in TABLE 31, the last coding pass of the subband LL5 is the CL pass, and the maximum number of passes is limited to 17.

A context judgment is made so that the seventh bit of the transform coefficient 33 shown in FIG. 14 belongs to either the SIG or CL pass. The eighth to tenth high-order bits are coded in a structure called "tag tree" when they belong to bit planes consisting only of 0 bits, whereas they are coded in the SIG or CL pass when coding has already started with coding passes. When the seventh bit belongs to the first coding pass (CL pass), a context judgment is made so that the lower-order bits than the seventh bit, including the sixth bit, belong to the MR pass. In general, lower-order bit planes than the bit plane from which coding starts are, from a view of coding efficiency, coded in the SIG, MR, and CL passes in this order. Since the maximum number of passes is limited to 17, a total of 17 passes ranging from the CL pass of the seventh bit to the SIG pass of the first bit are to be coded. However, the first bit is not coded because it belongs to the MR pass. Thus, the lower-order two bits are truncated, and the value after coding becomes "$00011010100_2 = 212_{10}$." When inverse quantized at the midpoint, this value becomes "$00011010110_2 = 214_{10}$."

Figure 15:
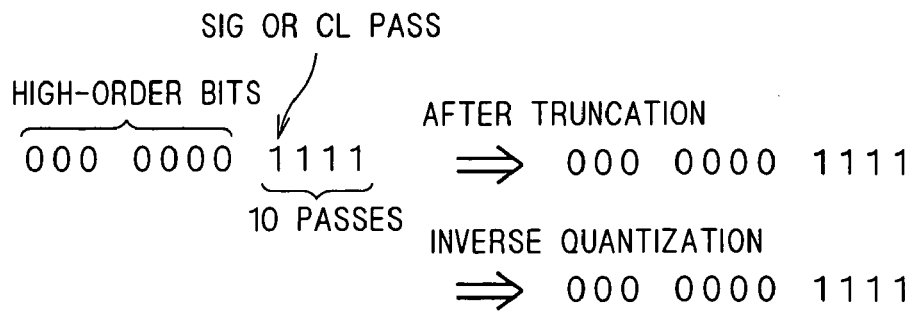

Next, FIG. 15 illustrates "$00000001111_2 = 15_{10}$" as one transform coefficient 33 in the subband LL5. The third bit of the transform coefficient 33 belongs to either the SIG or CL pass. The fourth to tenth high-order bits are coded in a tag tree structure when they belong to bit planes consisting only of 0 bits, whereas they are coded in either the SIG or CL pass when coding has already started with coding passes. When the third bit belongs to the first coding pass (CL pass), the lower-order bits than the third bit, including the second bit, belong to the MR pass, and a total of 10 passes ranging from the CL pass of the third bit to the CL pass of the zero-th bit are to be coded.

The value after truncation is "$00000001111_2=15_{10}$", and when inverse quantized, it becomes "$00000001111_2=15_{10}$".

Figure 16:
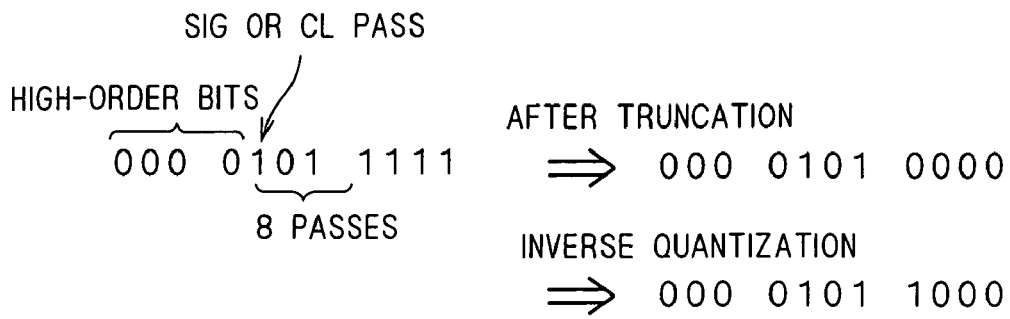
FIG. 16 is an explanatory diagram for an example of coding transform coefficients in subband HH2.

Next, FIG. 16 illustrates "$00001011111_2=95_{10}$" as one transform coefficient 33 in the subband HH2. As shown in TABLE 31, the last coding pass of the subband HH2 is the SIG pass, and the maximum number of passes is limited to 14. And, the lower-order three bit planes are truncated. The sixth bit of the transform coefficient 33 belongs to either the SIG or CL pass. The seventh to tenth high-order bits are coded in a tag tree structure when they belong to bit planes consisting only of 0 bits, whereas they are coded in either the SIG or CL pass when coding has already started with coding passes. When the sixth bit belongs to the first coding pass (CL pass), the lower-order bits than the sixth bit, including the fifth bit, belong to the MR pass. Since there is a limit that coding can be done on up to the SIG pass of the third bit plane, a total of 8 passes ranging from the CL pass of the sixth bit to the SIG pass of the third bit are to be coded; however, the third bit is not coded because it belongs to the MR pass. Thus, the value after truncation is "$00001010000_2=88_{10}$", and when inverse quantized at the midpoint, it becomes "$00001011000_2=88_{10}$".

Figure 17:
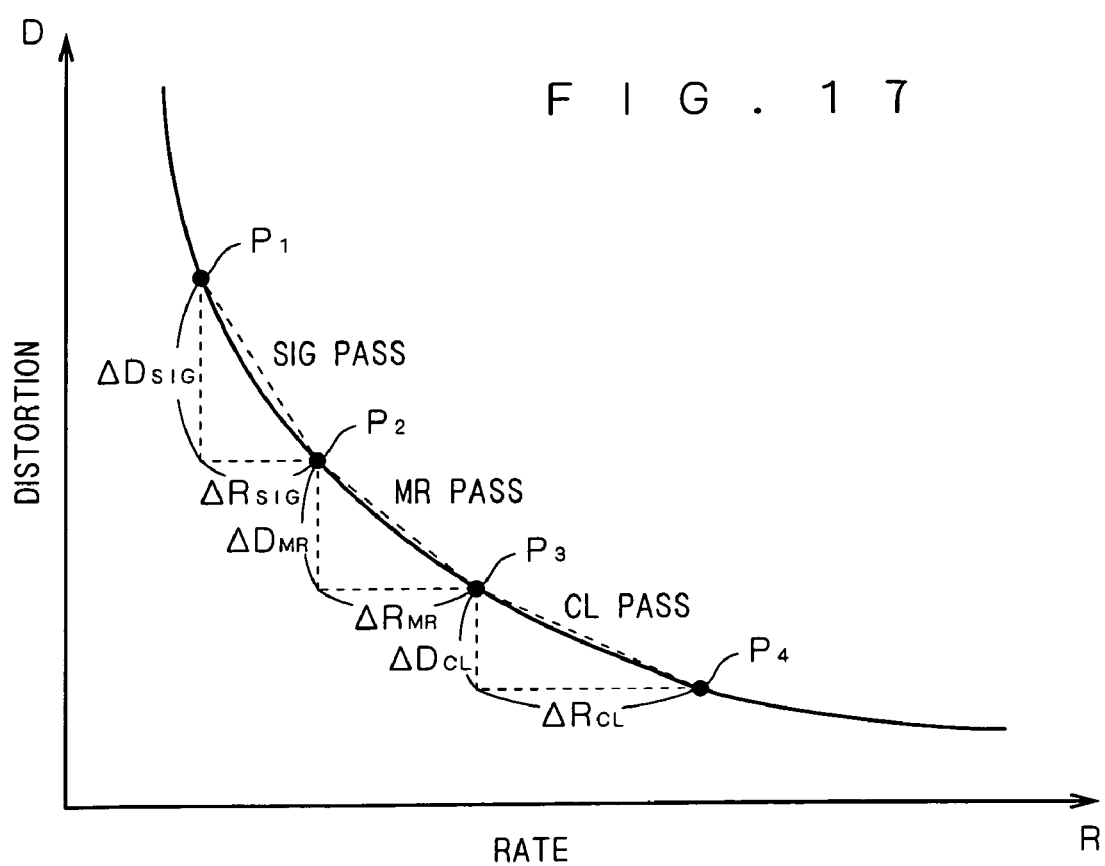
FIG. 17 shows a curve of rate-distortion characteristics.

The reason for coding each bit plane in the SIG, MR, and CL passes in this order is that it provides the highest coding efficiency against distortion in the SIG pass. FIG. 17 plots the rate-distortion characteristics in each coding pass. The portion of the R-D curve from the points $P_1$ to $P_2$ represents the SIG pass; the portion from the points $P_2$ to $P_3$ represents the MR pass; and the portion from the points $P_3$ to $P_4$ represents the CL pass. The ratios of distortion to rate $\Delta D_{SIG}/\Delta R_{SIG}$, $\Delta D_{MR}/\Delta R_{MR}$, $\Delta D_{CL}/\Delta R_{CL}$ in the respective coding passes show that the SIG pass has the steepest distortion-rate slope and thus achieves the highest coding efficiency.

As above described, in the image-quality control process according to this preferred embodiment, transform coefficients which are bit shifted according to the priorities are determined whether to be coded or not. Since only a target to be coded is selected, it is possible to achieve efficient rate control in order to produce a high-quality compressed image with less distortion.

<Rate Control>

Next, the processing details of the rate controller 11 shown in FIG. 2 are described. The rate controller 11 calculates a subtotal of the capacity of compressed and encoded data contained in an input bit stream on a subband-by-subband, bit-plane-by-bit-plane, or coding-pass-by-coding-pass basis. The rate controller 11 also calculates a truncation point appropriate to a target rate from a code sequence which is generated by sorting in order of scanning described below. Then, the rate controller 11 outputs the readout control signal CS1 to the MMU 3 so that a part of the code sequence before the truncation point is read out.

Figure 18:
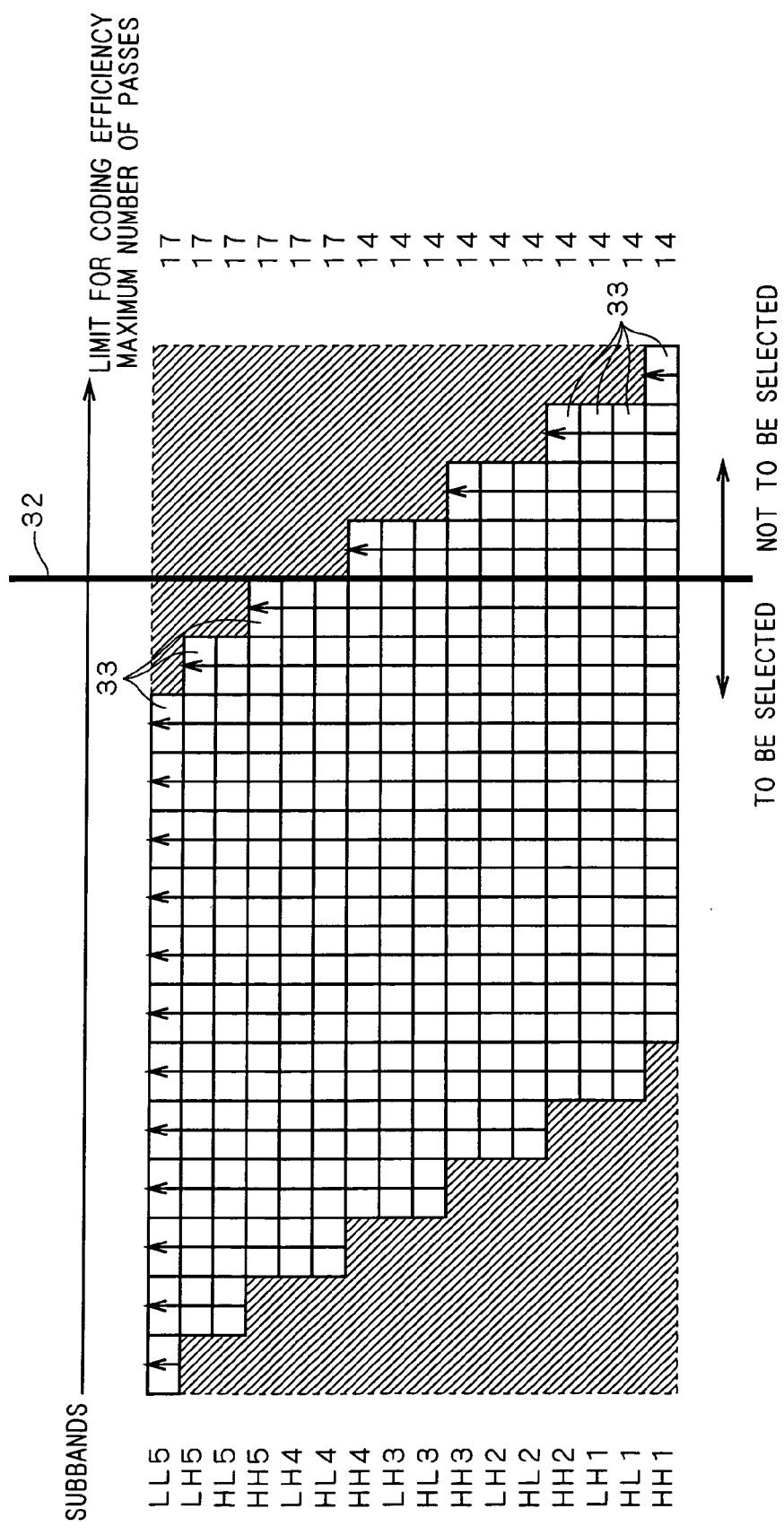
FIG. 18 is an explanatory diagram for an example of the order of scanning.
Figure 19:
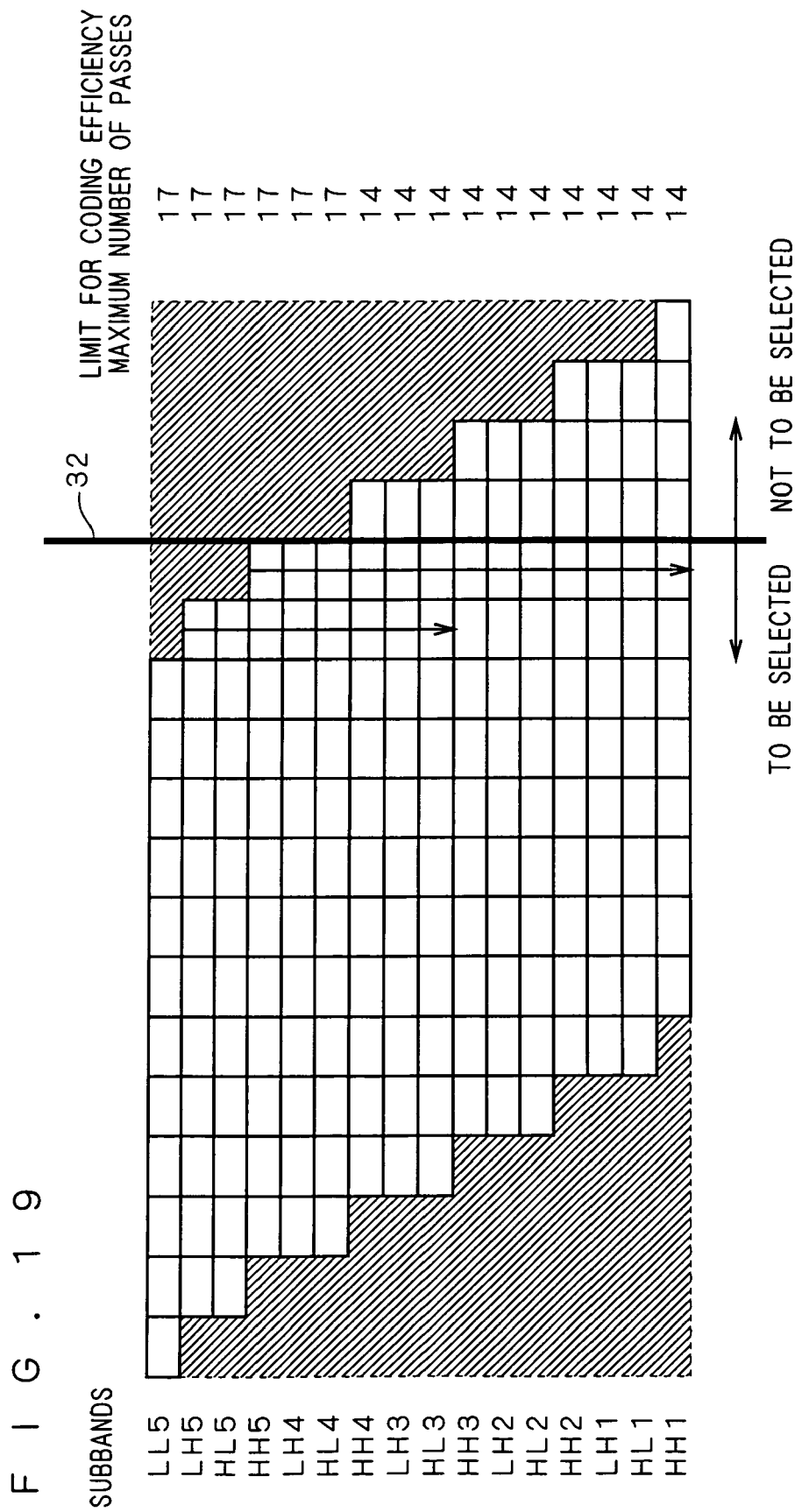
FIG. 19 is an explanatory diagram for an example of a truncation point.

FIGS. 18 and 19 are explanatory diagrams for examples of the order of scanning and the truncation point. FIGS. 18 and 19 show transform coefficients 33 which are bit shifted according to priorities by the same rule shown in FIG. 13.

As indicated by the arrows of FIG. 18, the transform coefficients 33 are sorted on a bit-plane-by-bit-plane or coding-pass-by-coding-pass basis in descending order of priority (from the most to the least significant bit) and, if the priority is the same, then in order of scanning from high pass to low pass. In general, there is a tendency that the lower the order of bit planes to be coded, the higher the ratio of the MR pass and then the lower the compression efficiency. Thus, at the same priority, the order of scanning from high pass to low pass is adopted in order to code as many SIG passes as possible and thereby to improve compression efficiency.

The rate controller 11 then determines a truncation point in order to satisfy conditions where the actual rate (number of bytes) is not more than the target rate (number of bytes) and truncates lower-order bit planes contained in a part of the code sequence after the truncation point. This allows efficient rate control of compressed and encoded data according to the priorities determined for each subband. For example when, as shown in FIG. 19, the second bit plane of the subband HL3 is determined as a truncation point to meet a target rate, bits indicated by the arrows are truncated.

Figure 20:
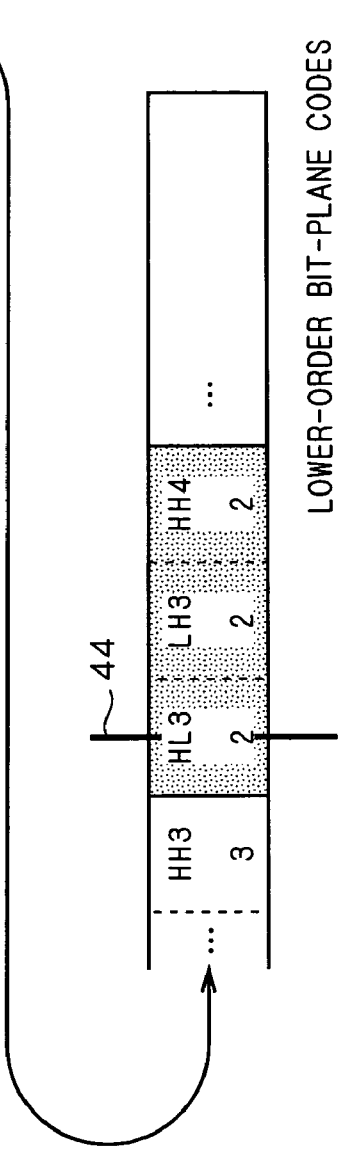
FIG. 20 shows a code sequence sorted by bit plane.

FIG. 20 illustrates a code sequence sorted by bit plane, and FIG. 21 illustrates a code sequence sorted by coding pass. In FIG. 20, each bit plane is labeled with a symbol indicating its subband such as LL5 and HL5 and with a bit-plane number such as 10 and 9. In this case, bit planes after a line 44 drawn on the second bit plane of the subband HL3 are truncated.

In FIG. 21, each bit plane is labeled with a symbol indicating its type of coding passes such as CL, SIG, and MR, with a symbol indicating its subband such as LL5 and HL5, and with a bit-plane number such as 10 and 9. In this case, bit planes after the line 44 drawn on the second bit plane of the subband H13 in the MR pass are truncated.

In this way, the rate control process according to this preferred embodiment eliminates the need for use of the amount of distortion in each coding pass for rate-distortion optimization and thereby achieves highly efficient rate control with high immediacy and with significantly reduced overhead.

<Layer Splitting>

Next, the operation of the layer splitting controller 7 shown in FIG. 2 is described below. The layer splitting controller 7 has a control function such as, by using the priority data PS2 obtained from the priority table 6, converting compressed and encoded data contained in an input bit stream into a code sequence which is bit shifted by the number of bits corresponding to priorities and then dividing that code sequence into a plurality of layers (multiple layers).

The following is a description of layer splitting. The MMU 3 temporarily stores an input bit stream into the mass storage 2. The layer splitting controller 7 obtains the data structure information DS on compressed and encoded data from the MMU 3. The layer splitting controller 7 then obtains the priority data PS2 from the priority table 6 and shifts transform coefficients in each subband in the compressed and encoded data by a predetermined number of bits in correspondence with priorities contained in the priority data PS2. Thereby, priorities are set for each subband of transform coefficients. As a method of setting priority, any one of the aforementioned first through third techniques for priority setting may be adopted.

Figure 22:
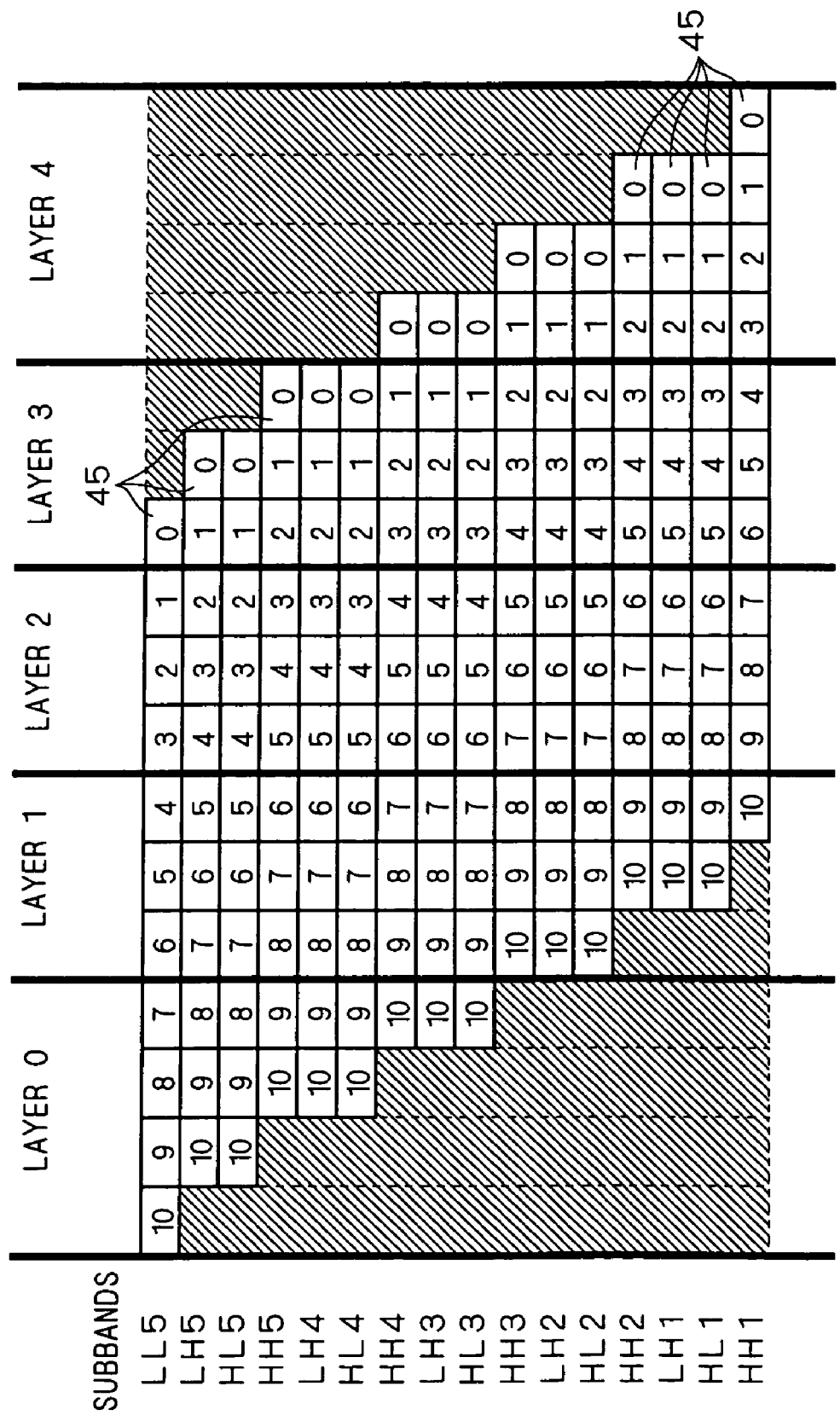
FIG. 22 is a schematic view illustrating coded data divided into a plurality of layers.
Figure 23:
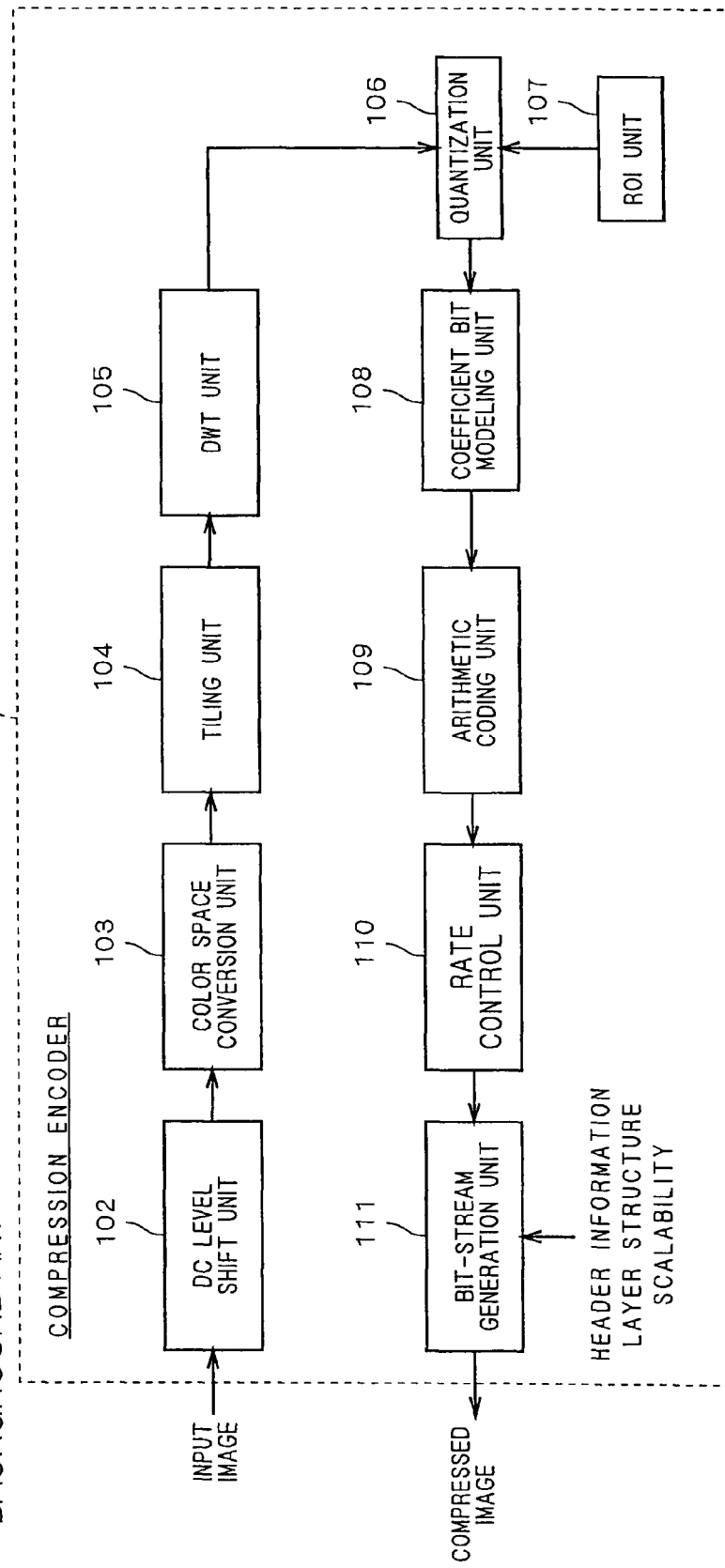
FIG. 23 is a functional block diagram showing a general configuration of a compression encoder according to the JPEG2000 standard.

FIG. 22 is a schematic view illustrating transform coefficients 45 which are shifted by the number of bits corresponding to priorities. The transform coefficients 45 in each of the subbands LL5 through HH1 are shifted to the right or left by the number of bits corresponding to the priorities. The numbers 0 through 10 on each bit of each transform coefficient 45 indicate a number of a bit plane to which that bit belongs. Here, the least significant bit number is 0, and the most significant bit number is 10.

Then, the layer splitting controller 7 determines, according to layer splitting information, splitting positions so that bit-shifted coded data is grouped into a plurality of layers on a bit-plane-by-bit-plane or coding-pass-by-coding-pass basis. The layer splitting information includes selection information for selecting either a single layer or multiple layers, and information for specifying layer splitting positions on a bit-plane-by-bit-plane or coding-pass-by-coding-pass basis. In the example of FIG. 22, splitting positions are shown at which compressed and encoded data is divided into five layers 0 through 4 on a bit-plane-by-bit-plane basis. The layer splitting controller 7 then supplies to the MMU 3 the readout control signal CS2 for reading out data layer by layer according to the splitting positions. The MMU 3, according to the readout control signal CS2, sequentially reads out the data OD stored in the mass storage 2 from the highest- to the lowest-order layer and outputs to the multiplexer 5.

In the aforementioned layer splitting process, priorities are set by shifting each subband by the number of bits corresponding to the priorities. Splitting bit-shifted subbands into multiple layers in this way allows efficient generation of multiple layers on a bit-plane-by-bit-plane or coding-pass-by-coding-pass basis in order to reduce distortion for a given rate. Accordingly, it is not necessarily required to use the aforementioned R-D optimization in the layer splitting process, so that layer splitting with high immediacy is allowed in order to reduce distortion.

While the invention has been shown and described in detail, the foregoing description is in all aspects illustrative and not restrictive. It is therefore understood that numerous modifications and variations can be devised without departing from the scope of the invention.

What is claimed is:

1. A rate control system including a processor for controlling a rate of compressed image data, comprising:

an image quality controller configured to, in compressed image data compressed by recursively dividing an image signal into high- and low-pass components using a wavelet transform to calculate transform coefficients in a plurality of bandpass components and entropy coding said transform coefficients, bit shift each of said plurality of bandpass components by a number of bits corresponding to a priority set based on a norm of 2-D synthesis filter coefficients of a predetermined bandpass component among said plurality of bandpass components and according to a number of recursive divisions, and select a target scanning area to be coded, based on a target image quality parameter, from said plurality of bandpass components that have been bit shifted, prior to generating a coded bit stream using the transform coefficients.

2. The rate control system according to claim 1, wherein said image quality controller is configured to use said priority to which weighting in consideration of human visual characteristics is applied.

3. The rate control system according to claim 1, wherein said image quality controller is configured to determine said target scanning area to be coded on a bit-plane-by-bit-plane basis.

4. The rate control system according to claim 1, wherein said image quality controller is configured to determine said target scanning area to be coded on a coding-pass-by-coding-pass basis.

5. The rate control system according to claim 1, further comprising:

a layer splitting controller configured to bit shift each of said plurality of bandpass components in said compressed image data by the number of bits corresponding to the priority set according to the number of recursive divisions into said low-pass components, and to divide said plurality of bandpass components that have been bit shifted into a plurality of layers.

6. The rate control system according to claim 5, wherein said layer splitting controller is configured to use said priority to which weighting in consideration of human visual characteristics is applied.

7. A rate control system including a processor for controlling a rate of compressed image data, comprising:

a rate controller configured to, in compressed image data compressed by recursively dividing an image signal into high- and low-pass components using a wavelet transform to generate transform coefficients in the plurality of bandpass components and entropy coding said transform coefficients, (1) bit shift each of said plurality of bandpass components by a number of bits corresponding to a priority set based on a norm of 2-D synthesis filter coefficients of a predetermined bandpass component among said plurality of bandpass components and according to a number of recursive divisions into said low-pass components; and (2) calculate a truncation point appropriate to a target rate from a code sequence generated by sorting coded data of said plurality of bandpass components that have been bit shifted, in a predetermined order of scanning, so that a part of said code sequence before said truncation point is outputted.

8. The rate control system according to claim 7, wherein said rate controller is configured to generate said code sequence by sorting said coded data in descending order of said priority and, if said priority is the same, then in said predetermined order of scanning, sorting from high pass to low pass.

9. The rate control system according to claim 7, further comprising:

a layer splitting controller configured to bit shift each of said plurality of bandpass components in said compressed image data by the number of bits corresponding to the priority set according to the number of recursive divisions into said low-pass components, and to divide said plurality of bandpass components that have been bit shifted into a plurality of layers.

10. The rate control system according to claim 9, wherein said layer splitting controller is configured to use said priority to which weighting in consideration of human visual characteristics is applied.

11. A computer readable medium storing a program for controlling a rate of compressed image data, said program, when executed on a microprocessor, causes the microprocessor to perform the steps of:

in compressed image data compressed by recursively dividing an image signal into high- and low-pass components using a wavelet transform to generate transform coefficients in a plurality of bandpass components and entropy coding said transform coefficients, bit shifting each of said plurality of bandpass components by a number of bits corresponding to a priority set based on a norm of 2-D synthesis filter coefficients of a predetermined bandpass component among said plurality of bandpass components and according to a number of recursive divisions into said low-pass components; and selecting a target scanning area to be coded based on a target image quality parameter, from said plurality of bandpass components that have been bit shifted.

12. The computer readable medium according to claim 11, wherein the program causes said microprocessor to perform the step of using said priority to which weighting in consideration of human visual characteristics is applied.

13. The computer readable medium according to claim 11, wherein the program causes said microprocessor to perform the step of determining said target to be coded on a bit-plane-by-bit-plane basis.

14. The computer readable medium according to claim 11, wherein the program causes said microprocessor to perform the step of determining said target to be coded on a coding-pass-by-coding-pass basis.

15. The computer readable medium according to claim 11, wherein the program causes said microprocessor to perform the step of:
bit shifting each of said plurality of bandpass components in said compressed image data by the number of bits corresponding to the priority set according to the number of recursive divisions into said low-pass components; and
dividing said plurality of bandpass components that have been bit shifted into a plurality of layers.

16. The computer readable medium according to claim 15, wherein the program causes said microprocessor to perform the step of using said priority to which weighting in consideration of human visual characteristics is applied.

17. A computer readable medium storing a program for controlling a rate of compressed image data, said program, when executed on a microprocessor causes the microprocessor to perform the steps of:
in compressed image data of the target to be coded, determined in the selecting step, compressed by recursively dividing an image signal into high- and low-pass components using a wavelet transform to generate transform coefficients in the plurality of bandpass components and entropy coding said transform coefficients, bit shifting each of said plurality of bandpass components by a number of bits corresponding to a priority set based on a norm of 2-D synthesis filter coefficients of a predetermined bandpass component among said plurality of bandpass components and according to a number of recursive divisions into said low-pass components; and
calculating a truncation point appropriate to a target rate from a code sequence generated by sorting coded data of said plurality of bandpass components that have been bit shifted, in a predetermined order of scanning, so that a part of said code sequence before said truncation point is outputted.

18. The computer readable medium according to claim 17, wherein the program causes said microprocessor to perform the step of generating said code sequence by sorting said coded data in descending order of said priority and, if said priority is the same, then in said predetermined order of scanning from high pass to low pass.

19. The computer readable medium according to claim 17, wherein the program causes said microprocessor to perform the steps of:
bit shifting each of said plurality of bandpass components in said compressed image data by the number of bits corresponding to the priority set according to the number of recursive divisions into said low-pass components; and
dividing said plurality of bandpass components that have been bit shifted into a plurality of layers.

20. The computer readable medium according to claim 19, wherein the program causes said microprocessor to perform the step of using said priority to which weighting in consideration of human visual characteristics is applied.

* * * * *